United States Patent
Price et al.

(10) Patent No.: US 10,914,214 B2
(45) Date of Patent: Feb. 9, 2021

(54) SCR DIESEL PARTICLE FILTER WITH OXIDATION CATALYST AND OXYGEN STORAGE CATALYST LOADINGS, AND EXHAUST SYSTEM INCLUDING THE SAME

(71) Applicant: UMICORE AG & CO. KG, Hanau-Wolfgang (DE)

(72) Inventors: Kenneth Price, Brighton, MI (US); Marcus Pfeifer, Solingen (DE); Christopher Owens, Taylor, MI (US)

(73) Assignee: UMICORE AG & CO. KG, Hanau-Wolfgang (DE)

(*) Notice: Subject to any disclaimer, the term of this patent is extended or adjusted under 35 U.S.C. 154(b) by 64 days.

(21) Appl. No.: 15/709,788

(22) Filed: Sep. 20, 2017

(65) Prior Publication Data
US 2018/0080359 A1     Mar. 22, 2018

Related U.S. Application Data

(60) Provisional application No. 62/397,164, filed on Sep. 20, 2016.

(51) Int. Cl.
*F01N 3/035*     (2006.01)
*F01N 3/20*     (2006.01)
(Continued)

(52) U.S. Cl.
CPC ....... *F01N 3/2066* (2013.01); *B01D 53/9418* (2013.01); *B01J 23/10* (2013.01);
(Continued)

(58) Field of Classification Search
CPC ............. F01N 2610/02; F01N 2610/10; F01N 2610/105; F01N 2610/107; F01N 2610/14;
(Continued)

(56) References Cited

U.S. PATENT DOCUMENTS 6,602,820 B1   8/2003   Göbel et al.
7,767,176 B2   8/2010   Patchett et al.
(Continued)

FOREIGN PATENT DOCUMENTS

DE   10 2009 039 249.1   8/2009
DE   10 2008 048 854 A   4/2010
(Continued)

OTHER PUBLICATIONS

Southward, B. et al. On the Development of Low PGM Content Direct Soot Combustion Catalysts for Diesel Particulate Filters. SAE International. 2010. SAE 2010-01-0558. 16 pages.
(Continued)

*Primary Examiner* — Phutthiwat Wongwian
*Assistant Examiner* — Diem T Tran
(74) *Attorney, Agent, or Firm* — Smith, Gambrell & Russell, LLP

(57) ABSTRACT

A particle filter for treating exhaust gases includes an SCR catalyst that, when in the presence of a reductant such as ammonia, promotes selective catalytic reduction of $NO_x$; an active oxidation catalyst that promotes oxidation of hydrocarbons and carbon monoxide; and an oxygen storage catalyst that alternately stores and releases oxygen, enhances soot oxidation, and stores NOx at temperatures below optimal SCR functioning. The particle filter may be included in a system having an oxidation catalytic device (OCD) upstream of the particle filter, and optionally includes one or more SCR converters upstream and/or downstream of the particle filter, and/or an ammonia slip catalyst downstream of the particle filter. The system may further be adapted for operation under a high frequency injection fuel control with an OCD having substantial NOx storage material content, or an NSC for improving the efficiency tradeoffs between soot oxidation during filter regeneration and $NO_x$ reduction.

29 Claims, 8 Drawing Sheets

(51) Int. Cl.
| | |
|---|---|
| B01J 29/85 | (2006.01) |
| B01J 29/46 | (2006.01) |
| F01N 3/08 | (2006.01) |
| B01J 29/70 | (2006.01) |
| B01J 29/72 | (2006.01) |
| B01J 35/04 | (2006.01) |
| B01D 53/94 | (2006.01) |
| B01J 35/00 | (2006.01) |
| F01N 13/00 | (2010.01) |
| B01J 23/42 | (2006.01) |
| B01J 23/10 | (2006.01) |
| C01C 1/00 | (2006.01) |
| C01B 21/04 | (2006.01) |
| B01J 23/72 | (2006.01) |
| B01J 21/06 | (2006.01) |

(52) U.S. Cl.
CPC .............. *B01J 23/42* (2013.01); *B01J 29/46* (2013.01); *B01J 29/7015* (2013.01); *B01J 29/723* (2013.01); *B01J 29/85* (2013.01); *B01J 35/0006* (2013.01); *B01J 35/04* (2013.01); *F01N 3/035* (2013.01); *F01N 3/0814* (2013.01); *F01N 13/009* (2014.06); *B01D 2255/1023* (2013.01); *B01D 2255/2065* (2013.01); *B01D 2255/20761* (2013.01); *B01D 2255/50* (2013.01); *B01D 2255/908* (2013.01); *B01D 2255/9022* (2013.01); *B01D 2255/9032* (2013.01); *B01D 2255/9155* (2013.01); *B01D 2257/404* (2013.01); *B01D 2258/012* (2013.01); *B01J 21/066* (2013.01); *B01J 23/72* (2013.01); *C01B 21/0422* (2013.01); *C01C 1/00* (2013.01); *F01N 2330/30* (2013.01); *F01N 2330/60* (2013.01); *F01N 2370/04* (2013.01); *F01N 2610/02* (2013.01); *Y02T 10/12* (2013.01)

(58) Field of Classification Search
CPC ....... F01N 2610/144; F01N 2610/1453; F01N 2610/146; F01N 2900/1808; F01N 2900/1811; F01N 3/0205; F01N 3/2026; F01N 3/2066; F01N 3/208; F01N 5/02; F01N 13/009; F01N 2330/30; F01N 2330/60; F01N 2370/04; F01N 3/035; F01N 3/0814; Y02A 50/2325; Y02T 10/16; Y02T 10/24; B01D 2255/1023; B01D 2255/2065; B01D 2255/20761; B01D 2255/50; B01D 2255/9022; B01D 2255/9032; B01D 2255/908; B01D 2255/9155; B01D 2257/404; B01D 2258/012; B01D 53/9418; B01J 21/066; B01J 23/10; B01J 23/42; B01J 23/72; B01J 29/46; B01J 29/7015; B01J 29/723; B01J 29/85; B01J 35/0006; B01J 35/04; C01B 21/0422; C01C 1/00
USPC ............................ 60/297, 301, 311
See application file for complete search history.

(56) References Cited

U.S. PATENT DOCUMENTS

| | | | |
|---|---|---|---|
| 8,475,753 B2 | 7/2013 | Eckhoff et al. | |
| 8,820,054 B2 | 9/2014 | Bisaiji et al. | |
| 8,821,820 B2 | 9/2014 | Seyler et al. | |
| 8,865,120 B2 | 10/2014 | Wen et al. | |
| 9,021,788 B2 | 5/2015 | Inoue et al. | |
| 9,328,682 B2 | 5/2016 | Hoyer et al. | |
| 2004/0065078 A1* | 4/2004 | Schafer-Sindlinger | B01D 53/944 60/295 |
| 2005/0282698 A1 | 12/2005 | Southward et al. | |
| 2006/0010859 A1* | 1/2006 | Yan | F01N 3/035 60/286 |
| 2009/0158719 A1* | 6/2009 | Hallstrom | B01D 53/9477 60/297 |
| 2009/0193796 A1* | 8/2009 | Wei | B01D 53/9445 60/297 |
| 2009/0304566 A1* | 12/2009 | Golden | B01D 53/9418 423/239.2 |
| 2010/0055012 A1 | 3/2010 | Grisstede et al. | |
| 2010/0175372 A1* | 7/2010 | Lambert | B01D 53/9472 60/297 |
| 2010/0233051 A1 | 9/2010 | Grisstede et al. | |
| 2011/0173950 A1* | 7/2011 | Wan | B01D 53/9418 60/274 |
| 2011/0229391 A1* | 9/2011 | Paulus | B01D 53/9468 423/213.2 |
| 2011/0289903 A1* | 12/2011 | Doring | F01N 3/0231 60/274 |
| 2013/0243659 A1* | 9/2013 | Sutton | B01D 53/944 422/168 |
| 2016/0038875 A1 | 2/2016 | Schuetze | |

FOREIGN PATENT DOCUMENTS

| | | |
|---|---|---|
| EP | 1 101 528 A2 | 5/2001 |
| EP | 1 317 953 A1 | 6/2003 |
| EP | 1 016 448 B1 | 5/2006 |
| EP | 1 321 186 B1 | 7/2006 |
| EP | 1 911 506 A1 | 4/2008 |
| JP | H01-151706 A | 6/1989 |
| WO | 2005/016497 A1 | 2/2005 |
| WO | 2005/092481 A1 | 10/2005 |
| WO | 2008/106519 A1 | 9/2008 |
| WO | 2008/118434 A1 | 10/2008 |
| WO | 2008/132452 A2 | 11/2008 |
| WO | 2011/023332 A1 | 3/2011 |
| WO | 2013/126619 A1 | 8/2013 |
| WO | 2012/140784 A1 | 7/2014 |
| WO | 2014/161860 A1 | 10/2014 |
| WO | 2013/008342 A1 | 2/2015 |

OTHER PUBLICATIONS

Pfeifer, M., et al. The Second Generation of Catalyzed Diesel Particulate Filter Systems for Passenger Cars—Particulate Filters with Integrated Oxidation Catalyst Function. SAE Technical Paper, SAE 2005-01-1756, 2005 (15 pages).

Pfeifer, M., et al. New Platinum/Palladium Based Catalyzed Filter Technologies for Future Passenger Car Applications. SAE Technical Paper, SAE 2007-01-0234, 2007 (14 pages).

Bisaiji, Y., et al. Development of Di-Air—A New Diesel deNOx System by Adsorbed Intermediate Reductants. SAE Int. J. Fuels Lubr., vol. 5, Issue 1, SAE 2011-01-2089, 2012, pp. 380-388.

Szailer, T., et al. Advanced Catalyst Solutions for Hydrocarbon Emissions Control During Rich Operation of Lean NOx Trap Systems. SAE Technical Paper. SAE 2009-01-0282, 2009 (10 pages).

Ohki, H., et al. Control Technology for a Passenger Car Diesel Engine Equipped with the DPNR System. SAE Technical Paper, SAE 2003-01-1880, 2003 (7 pages).

* cited by examiner

SCR DIESEL PARTICLE FILTER WITH OXIDATION CATALYST AND OXYGEN STORAGE CATALYST LOADINGS, AND EXHAUST SYSTEM INCLUDING THE SAME

FIELD OF THE INVENTION

The present invention relates to a diesel particle filter (DPF) with a selective catalytic reduction (SCR) function and loadings of an oxidation catalyst (OC) and an oxygen storage catalyst (OSC), diesel exhaust systems having such a modified DPF, and the use thereof in the purification of diesel exhaust gases.

BACKGROUND OF THE INVENTION

The exhaust gas of a motor vehicle operated with a diesel engine comprises carbon monoxide (CO), nitrogen oxides ($NO_x$), and further constituents originating from the incomplete combustion of the diesel fuel in the engine. The further constituents include residual hydrocarbons (HC) that are present, predominantly, in gaseous form; and particle emissions that are referred to as "diesel soot", "soot particles", or "particulate matter".

Purification of such diesel exhaust gases, requires the constituents be converted as completely as possible into non-hazardous compounds, which is possible using suitable catalytic converters. For example, CO, gaseous HC and some organic agglomerates adhered to the soot particles (so-called "volatile organic fraction", VOF) may be removed by oxidation with the aid of diesel oxidation catalytic (DOC) converters. As components active in oxidation catalysis, DOC converters regularly make use of the platinum-group metals (PG metals, or PGM) which often entails the use of platinum (Pt) and/or palladium (Pd).

The removal of particle emissions in diesel exhaust gases is achieved through use of diesel particle filters (DPF) which may be provided with a coating active in oxidation catalysis (i.e., a catalyzed diesel particle filter, or a cDPF). A further understanding of cDPF's may be found in SAE 2005-01-1756 and SAE 2007-01-0234, the contents of each of which are incorporated herein in their entireties. In a cDPF, the catalytic coating serves to lower the activation energy for oxygen-based particle burn-off (soot combustion), thus decreasing the ignition temperature for soot trapped on the filter and improving regeneration behavior thereof. The catalytic coating also serves to oxidize HC and CO constituents that breakthrough an upstream oxidation catalytic device (OCD), or CO constituents that are released in the combustion of soot, to thereby suppress the emissions of such constituents. However, the catalytic coating of the cDPF may also display the effect of oxidizing nitrogen monoxide (NO) contained in the exhaust gas to form nitrogen dioxide ($NO_2$).

$NO_x$ constituents in the diesel exhaust gas, including $NO_2$ formed by a cDPF, may be converted into non-hazardous nitrogen ($N_2$), for example, by selective catalytic reduction (SCR) with a reducing agent such as ammonia ($NH_3$) on an SCR converter. The reducing agent is often introduced into the exhaust tract from an on-board auxiliary tank by means of an injection nozzle upstream of the SCR converter. Rather than ammonia itself, however, there is often employed a compound that breaks down easily to form ammonia, for example urea or ammonium carbamate. In some systems there may be provided a device upstream of the SCR converter that generates $NH_3$ without need for a separate reducing agent supply.

An example of a conventional diesel exhaust-gas treatment system 1 is illustrated in FIG. 1. As viewed in the flow direction of exhaust gas exiting a diesel engine 2, there is normally arranged first a DOC converter 3, followed by a cDPF 4, and finally an SCR converter 5. Between the cDPF 4 and the SCR converter 5 there is often situated an injection device 6 for dosing of a reducing agent for use in $NO_x$ reduction at the SCR converter 5.

In such a conventional system 1, however, it has been found that the operating temperature of the SCR converter 5 is limited at start-up and during early running cycles. In particular, the thermal mass of the upstream components, in particular the cDPF 4, delays the transfer of heat energy from the diesel engine 2 to the SCR converter 5. As a result, the SCR converter 5 in such a conventional system 1 often exhibits poor $NO_x$ reduction during start-up and early operation cycles.

Prior attempts to improve SCR performance have included combining a DPF and an SCR converter by applying an SCR catalyst to the DPF, thus making an SCR-coated DPF (i.e., an sDPF), which is also known as an SCR filter (SCRf), see for example JP H1-151706 and WO 2005/016497A1 the contents of each of which are incorporated herein in their entireties. FIG. 1A illustrates one example of a system 1A employing such a conventional sDPF 7 downstream of a DOC 3. However, it has been found that the system 1A, using a conventional sDPF 7, will incur an inverse tradeoff between $NO_x$ reduction and filter regeneration efficiencies. For example, at operating temperatures at or above approximately 575° C., a conventional sDPF may exhibit more favorable filter regeneration efficiency (soot particulate oxidation and burn-off), though decreased $NO_x$ reduction efficiency via the SCR catalyst coated thereon—whereas, at operating temperatures at or below approximately 525° C., the conventional sDPF may exhibit more favorable $NO_x$ reduction efficiencies via the SCR catalyst coated thereon, though a reduced filter regeneration efficiency.

Thus, there remains a need in the art for a diesel exhaust treatment system that can address the SCR performance issues, particularly during start-up and early running cycles of operation, while at the same time reducing, and preferably foregoing, the inverse tradeoff between $NO_x$ reduction efficiencies and filter regeneration efficiencies that are incurred with a conventional sDPF.

SUMMARY OF THE INVENTION

The present invention concerns a particle filter having a coating that includes an SCR catalyst that, when in the presence of a reductant such as ammonia, promotes the selective catalytic reduction of $NO_x$; an oxidation catalyst (OC) component that promotes the oxidation of hydrocarbons and carbon monoxide; and an oxygen storage catalyst (OSC) component that alternates between adsorbing and storing oxygen and desorbing and releasing oxygen. Such a particle filter may be referred to as an SCR catalyzed DPF, or an scDPF.

The SCR catalyst may include at least one material selected front: MOR; USY; ZSM-5; ZSM-20; beta-zeolite; CHA; LEV; AEI; AFX; FER; SAPO; ALPO; vanadium; vanadium oxide; titanium oxide; tungsten oxide; molybdenum oxide; cerium oxide; zirconium oxide; niobium oxide; iron; iron oxide; manganese oxide; copper; molybdenum; tungsten; and mixtures thereof. The support structures for the active components of the SCR catalyst may include any suitable zeolite, zeotype, or non-zeolitic compound. Alternatively, the SCR catalyst may include a metal, a metal oxide, or a mixed oxide as the active component. Transition metal loaded zeolites (e.g., copper-chabazite, or Cu-CHA, as well as copper-levyne, or Cu-LEV) and zeotypes (e.g., copper-SAPO, or Cu-SAPO) are preferred; with the scDPF preferably having a copper-SCR catalyst loading of 30 g/l or greater.

The OC component includes at least one material selected front: platinum; palladium; rhodium; silver; gold; copper; iron; and combinations thereof, or transition metals such as copper or iron, that are loaded in a sufficient manner as to exhibit an oxidation function separate front their incorporation with a support structure for the purpose of providing an SCR function. The OSC component includes at least one material selected from: basic compounds of alkali metals; alkaline earth metals; magnesium; barium; strontium; calcium; cerium; and combinations thereof.

Preferably, the OC component includes palladium, and the OSC component includes cerium. The OSC component may further include (e.g., in addition to the preferred cerium) at least one further material having an oxygen storage and release function, which may be formulated to enhance an oxygen storage/redox function, as well as an NOx storage potential and stability.

The coating including the SCR catalyst, the OC component and the OSC component may be applied over the entire length of the filter body; and may be a single layer coating in which the SCR catalyst, OC component, and OSC component are homogenously mixed. Alternatively, the coating may include an arrangement of the SCR catalyst, the OC component, and the OSC component whereby, upon delivering an exhaust gas stream containing $NO_x$ and $NH_3$ into an inlet end of the scDPF, there is promoted an initial contact of the $NO_x$ and the $NH_3$ with the SCR catalyst prior to an initial contact of the $NO_x$ and the $NH_3$ with the OC component, and optionally prior to an initial contact of the $NO_x$ and the $NH_3$ with the OSC component.

When using a coating having an arrangement for controlling introduction of exhaust gases to the SCR catalyst, the OC component, and the OSC component, the arrangement may include a zoning arrangement (i.e., differences in axial positioning of the components), a layering arrangement (i.e., differences in radial positioning of the components), and combinations thereof. It is to be understood that the various reactive materials (SCR catalyst, OC component, and OSC component) are coated, primarily, within the pores of the porous walls of a wall-flow support body. Thus, while some quantity of these materials (or any other further added materials) might be present on the surfaces of the flow channels of the wall-flow support body (on the surfaces of the inlet channels and/or the surfaces of the outlet channels), references to the coating are to be understood as referring, primarily, to the coating within the pores of the porous walls of the wall-flow support body.

In an example of a zoning arrangement, the SCR catalyst may be positioned over the entire length of the scDPF, with the OC component and the OSC component positioned in one or more zones toward an outlet end of the scDPF. At least one boundary between two zones in such a zoning arrangement may include a gradient, whereby a first zone gradually decreases in quantity and/or a second zone gradually increases in quantity.

In an example of a layering arrangement, both the OC component and the OSC component may be positioned in one or more layers, with, for example, the SCR catalyst applied as an overcoat layer over the one or more layers that includes the OC component and the OSC component. This layering effect may be achieved by applying the OC component (with or without the OSC component) substantially within the porous wall, and then applying the SCR catalyst (with or without the OSC component) substantially within the porous wall, over the layer containing the OC component. Such a layering arrangement may be accomplished by applying the OC component coating first, and then applying the SCR catalyst coating from the same end of the support body; or by applying the SCR catalyst coating and the OC component coating from different ends of the support body. Though this example concerns a layering arrangement of the materials within porous walls, it is understood that layering arrangements may also be used on support bod types that lack porous walls, by simply applying the materials in layers. Regardless of the process used to apply the separate coatings, it is preferable that the OC component (with or without the OSC component) be biased toward the outlet channels or be substantially covered by SCR catalyst coating (with or without the OSC component), or both. Such coating arrangements enable an exhaust gas that is introduced through the inlet channels to interact first with the SCR catalyst before interacting with the OC component, thus encouraging a reaction of incoming $NH_3$ and NOx with the SCR catalyst before interacting with the OC component. The OSC component can be present in either the OC component containing coating, the SCR catalyst containing coating, or both. At least one boundary between two layers in the layering arrangement may include a gradient, whereby a first layer gradually decreases, a second layer gradually increases in quantity, or whereby a first layer gradually decreases as a second layer gradually increases.

The arrangement of the coating may also be made to provide the OSC component over a greater portion of the filter body than that portion over which the OC component is provided. For example, the OSC component may be present over the entire length of the filter body, whereas the OC component may be present over only a portion of the filter body, preferably with the OC component positioned toward an outlet end of the filter body.

The scDPF may be placed in an exhaust treatment system that further includes an oxidation catalytic device (OCD) positioned upstream of the scDPF. The OCD may be a diesel oxidation converter (DOC), or an $NO_x$ storage catalyst (NSC). If using a DOC, the DOC may be a diesel oxidation adsorbing catalyst (DOAC), which may provide a limited $NO_x$ storage and release function, wherein the $NO_x$ can be released without active regeneration of the filter body. An engine control unit (ECU) can be relied upon to provide a lean/rich cycle and/or an independent hydrocarbon injector may be positioned upstream of the OCD for injecting a supply of hydrocarbons to the OCD, which may be inclusive of a hydrocarbon injector configured for injecting a hydrocarbon supply, including but not restricted to one capable of operating under high frequency injection (HFI) fuel control.

An exhaust system with the modified particle filter of the present invention (i.e., the scDPF) may further include one or more SCR converters positioned upstream and/or downstream of the scDPF. Examples include SCR converters with common metal characteristics and/or common support bodies relative to one another, or ones of different metal characteristics (e.g., different loading of metal types or combinations) and/or different support bodies (e.g., different zeolite, zeotypes, or molecular sieves). One or more of the SCR converters may have a copper loaded chabazite structure and/or a copper loaded SAPO structure and/or a copper loaded levyne structure. When including an SCR converter, the scDPF may include a SAPO structure, and the one or more SCR converters may include a chabazite and/or a levyne structure. However, embodiments of the invention are also inclusive exhaust systems wherein no further SCR component is provided upstream and/or downstream of the scDPF; and embodiments wherein the SCR catalyst of the scDPF represents the sole SCR component in the entire exhaust system.

An exhaust system with the modified particle filter of the present invention may further include one or more ammonia slip catalyst (ASC) components. An ASC component may be provided on the scDPF itself, at a position toward an outlet end of the filter body. An ASC component may also be provided on a device positioned downstream of the scDPF, which downstream device may (or may not) be an SCR converter. If provided on a downstream SCR converter, the ASC component will be positioned toward an outlet end of the SCR converter. Note that the current invention differs from an ASC function coated on the rear of a conventional sDPF in that, in the conventional sDPF, under normal diesel operating temperatures, the primary function of the conventional oxidizing sDPF is simply that of an SCR catalyst and there is little oxidation of $NH_3$ to interfere with the SCR function of the conventional sDPF or any SCR converter behind it.

The scDPF, and an exhaust system including the same, may be used in the treatment of exhaust gases emitted from an internal combustion engine by passing the emitted exhaust gases through an exhaust line including the scDPF and any other treatment device (e.g., the OCD; SCR converter; ASC component; etc.). When using a DOAC or an NSC, the treatment method may include use of an HFI fuel control. For example, the method may include elevating the temperature of the DOAC by operating the hydrocarbon injector under an HFI fuel control to introduce a supply of hydrocarbons to the DOAC, thereby promoting oxidation of soot trapped at the scDPF during a filter regeneration cycle. Under these conditions, and with appropriate pulse quantity, duration and separation, certain DOAC and NSC can exhibit NOx conversion in the range of 70-95% efficiency while providing conditions for regeneration of an scDPF following it. Use of the HFI fuel control, however, is not limited to promoting oxidation of soot; and may also be used to desulfate the NAC component of the OCD by introducing hydrocarbons to the OCD, in high frequency rich/lean oscillations, regardless of whether a filter regeneration cycle of the scDPF is also intended.

Both the foregoing general description and the following detailed description are exemplary and explanatory only, and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

The following disclosure discusses the present invention with reference to the examples shown in the accompanying drawings, though does not limit the invention to those examples.

Figure 1:
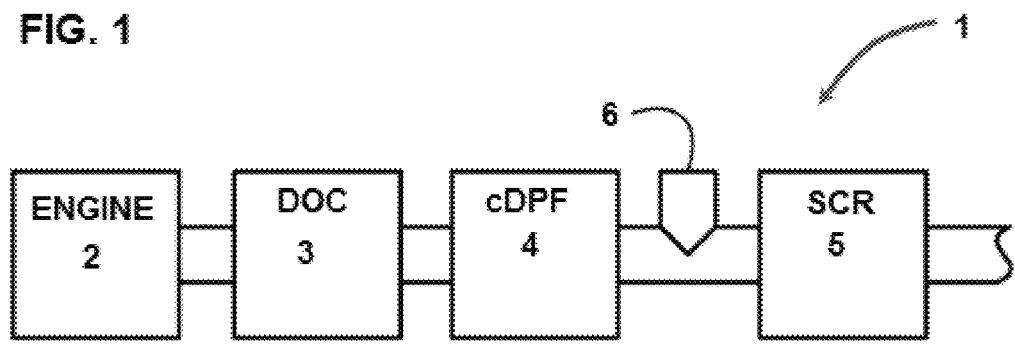
FIG. 1 illustrates a first conventional diesel exhaust-gas treatment system.
Figure 1A:
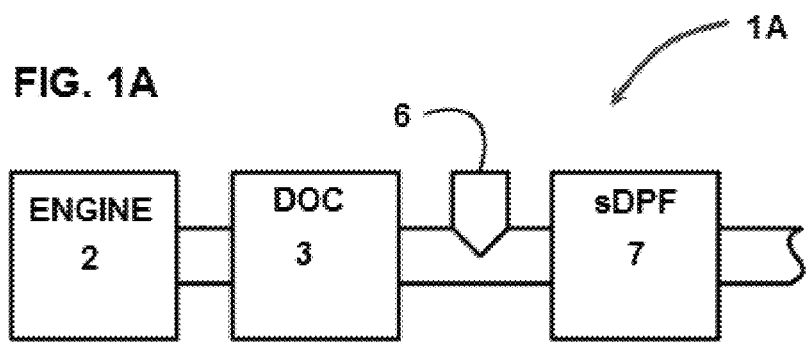
FIG. 1A illustrates a second conventional diesel exhaust-gas treatment system.
Figure 2:
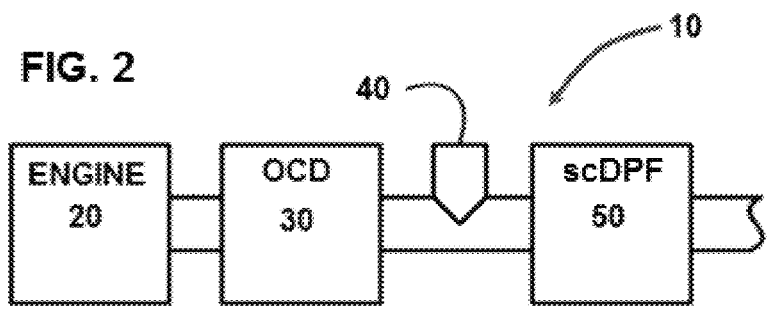
FIG. 2 illustrates a first example of an exhaust treatment system according to the present invention.
Figure 3:
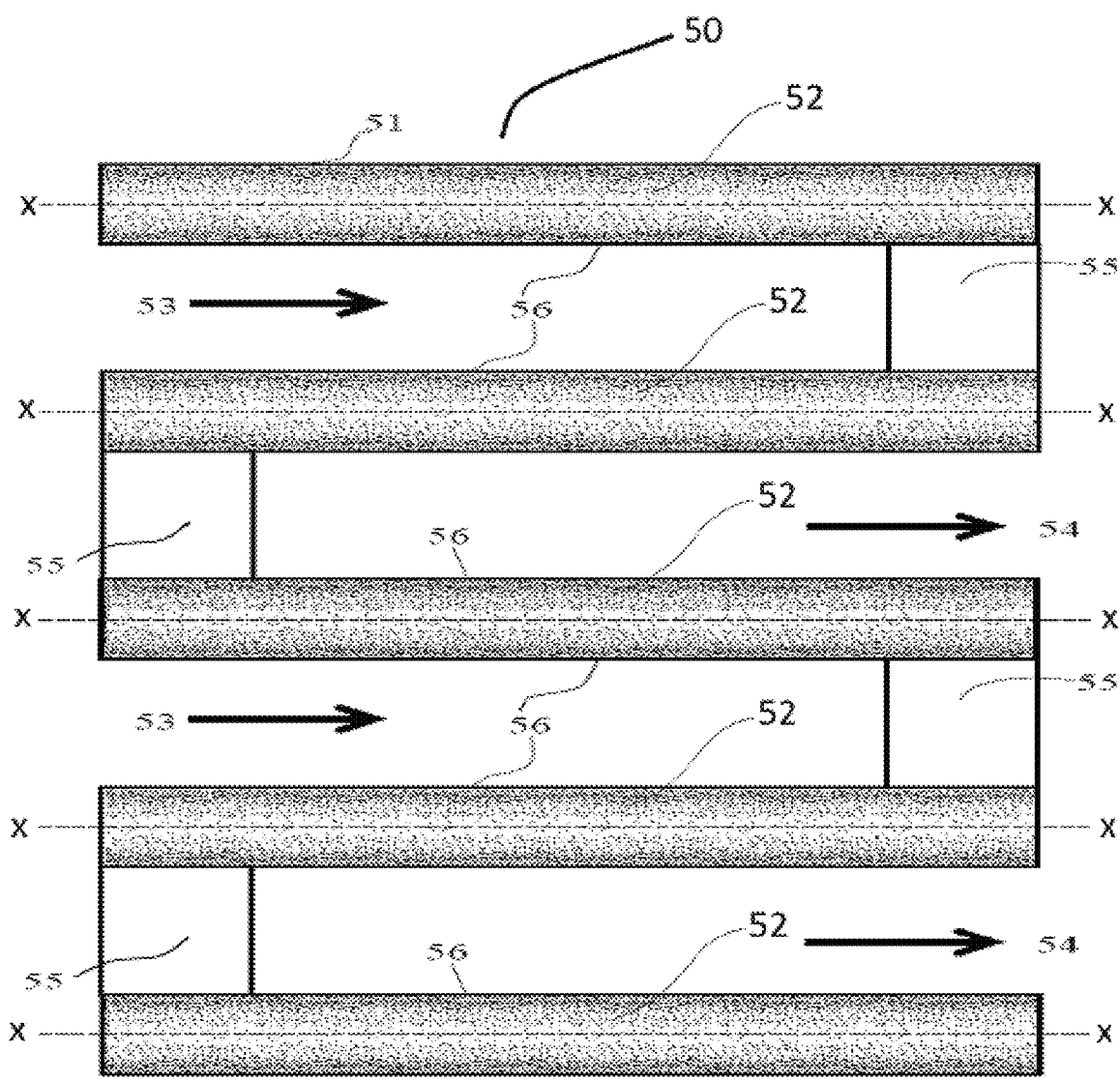
FIG. 3 illustrates one example of an scDPF according to the present invention.

The present invention concerns an exhaust system 10, such as that illustrated in FIG. 2, having an scDPF 50 (i.e., an SCR catalyzed DPF), such as that illustrated in FIG. 3; and the use thereof in the purification of diesel exhaust gases. An scDPF 50 according to the present invention includes a DPF body 51 having a coating 52 that includes an SCR catalyst, as well an amount, in particular a smaller amount, of oxidation catalyst (OC) component (e.g., platinum-group metals; PGM's) and oxygen storage catalyst (OSC) component (e.g., rare earth oxides; REO).

An scDPF according to the present invention, as well as exhaust system including such an scDPF, is considered to enhance particle burn-off during filter regeneration; further promote the oxidation of HC and CO constituents; and improve the tradeoff losses between the SCR reduction of $NO_x$ and particle burn-off during filter regeneration. The latter is particularly true where the NOx reduction function of the system is provided by an NSC and where provisions for high frequency injection of HC into the NSC during filter regenerations is provided such that the NSC under the HFI conditions both removes most of the NOx and provides appropriate conditions for the regeneration of soot at the scDPF.

As illustrated in the example shown in FIG. 3, an embodiment of the invention features a wall-flow filter honeycomb as a support body 51 for the scDPF 50. The wall-flow filter honeycomb body 51 has a number of parallel ducts 53/54 that extend along the longitudinal length thereof. Adjacent ducts 53/54 are alternately closed off by gas-tight seals 55 at opposite ends of the honeycomb body 51. That is, a first half of the ducts (i.e., inflow ducts 53) are open at an inflow side and sealed at an outflow side of the honeycomb body 51, while the remaining half of the ducts (i.e., outflow ducts 54) are sealed at the inflow side and open at the outflow side of the honeycomb body 51. Inflow ducts 53, with open ends at the inflow side, are separated from outflow ducts 54, with open ends at the outflow side, by porous walls 56. Axes X-X designate the approximate half-way distance between the inlet and outlet surfaces of the porous walls 56.

Particle-containing exhaust gases that flow into the inflow ducts 53 are forced, by the gas-tight seals 55 at the opposite ends of the inflow ducts 53, to pass through the porous walls 56 and into adjacent outflow ducts 54 that open at the outflow side of the honeycomb body 51. Particulates, such as diesel soot, are effectively filtered out of the exhaust gas as it passes through the porous walls 56. The trapped particulates are subsequently burned-off during filter regeneration of the scDPF 50, either by "active" regeneration or, under certain conditions of temperature, mass flow of particulates and $NO_2$, by "passive" regeneration.

The honeycomb body 51 may be made of suitable heat-resistant materials such as metal and/or ceramic materials. Preferably, the honeycomb body 51 is composed of: cordierite, cordierite-alumina, silicon nitride, mullite, zircon mullite, spodumene, alumina-silica magnesia, zircon silicate, sillimanite, a magnesium silicate, zircon, petalite, alpha-alumina, an aluminosilicate, silicon carbide (SiC), aluminum titanate, or high temperature steel alloys, or the like, and combinations thereof.

In the present invention, the honeycomb body 51 is rendered a catalyzed DPF (i.e., a cDPF), by the presence of some quantity of an OC component (e.g., a PGM material), as well as the further presence of some quantity of an OSC component (e.g., an REO material), which are both coated on the honeycomb body 51 in one or more layers. The honeycomb body 51 is further rendered a selective catalytic reduction DPF (i.e., an SCR catalyzed DPF; or an scDPF) by the further presence of an SCR catalyst that is also coated on the honeycomb body 51 in one or more layers.

While FIG. 3 illustrates an example where the honeycomb body 51 is a wall-flow honeycomb body, the support body for the scDPF may take a number of different forms, including, for example, one or more corrugated sheets; a mass of fibers (e.g., a fleece of woven or matted metallic sintered fibers); a mass of open-cell foam; a volume of porous particle bodies; and other filter-like structures.

The SCR catalyst of the scDPF is any catalyst that effectively catalyzes the selective catalytic reduction of $NO_x$ in the presence of a suitable reducing agent. This coating contains one or more SCR active components, which are preferably selected from:
 a) catalyst-loaded zeolite compounds, which may include: small-pore zeolites (SPZ), which may include: CHA, LEV, AEI, AFX, or non-SPZ zeolites, which may include MOR, USY, ZSM-5, ZSM-20, beta-zeolite, FER, and mixtures thereof;
 b) catalyst-loaded zeotype compounds (e.g., non-zeolite compounds that are zeolite-like in that they have zeolite-type structural configurations—so-called, zeolite-structured compounds), which may include: SAPO (in particular SAPO-34), ALPO, and mixtures thereof;
 c) catalyst-loaded non-zeolitic compounds (e.g., non-zeolite and non-zeotype compounds that do not have zeolite-type structural configurations—so-called, non-zeolite-structured compounds), which may include: cordierite, and silicon.
 d) metals and metal oxides, which may include: vanadium, vanadium oxide, titanium oxide, tungsten, tungsten oxide, molybdenum, molybdenum oxide, cerium oxide, zirconium oxide, copper, iron, niobium oxide, iron oxide, manganese oxide, mixed oxides thereof, or mixtures thereof; and
 e) mixtures of (a); and/or (b); and/or (c); and/or (d).

Catalyst loadings may include any formulation of: copper (Cu); cobalt (Co); and/or iron (Fe). See for example WO 2008/106519 A1, WO 2008/118434 A1, WO 2008/132452A1 and WO 2013/126619 A1, the contents of each of which are incorporated herein in their entireties. Preference is given to iron, copper and iron/copper combinations; with particular preference for copper. The application of catalyst loadings may be achieved via coating, ion-exchange, doping, and/or sublimation processes.

Among the foregoing SCR catalysts, preference may be given to Cu-loaded CHA, suitable examples of which may be found in U.S. Pat. No. 8,821,820 and WO 2014/161860, the contents of each of which are incorporated herein in their entireties. Preference may also be given to Cu-loaded SAPO-34, suitable examples of which may be found in U.S. Pat. No. 8,865,120, the contents of which are incorporated herein in its entirety. Preference may further be given to Cu-LEV, Cu-AEI and Cu-AFI.

The SCR catalyst, in the presence of $NH_3$ (or another reductant source), promotes the reduction of $NO_x$ constituents in the exhaust gas flow—such as those output from an upstream diesel engine, either directly or as breakthrough from an upstream OCD; as well as those produced by an oxidation reaction of an upstream OCD.

The OC component included in the scDPF may include one or more precious metals, which may include PGM materials chosen from: platinum (Pt), palladium (Pd), rhodium (Rh), ruthenium (Ru), osmium (Os), and iridium (Ir). Preferably, the OC component is palladium (Pd), as it is has been found to display a favorable delay in $NH_3$ oxidation, as well as favorable oxidation of HC and CO constituents at high temperatures characteristic of filter regeneration conditions (e.g., typically above 500° C.). Preference may also be given to a combination of Rh and Pd, as such a combination has been shown to be effective particularly in the oxidation of HC and CO during filter regeneration conditions without excessive oxidation at lower temperatures, particularly for the suppression of NO to $NO_2$ oxidation, whereby soot that may otherwise be in contact with the OSC material would be oxidized, thus leaving gaps in the contact of soot with OSC material. Examples of such a combination may be found in SAE 2010-01-0558 and US Pre-Grant Publication 2005/0282698, the contents of each of which are incorporated herein in their entireties. In place of, or in addition to, a PGM material, the OC component may include one or more materials chosen from: silver (Ag), gold (Au), copper (Cu), and iron (Fe).

The OC component promotes the oxidation of HC and CO constituents in the exhaust gas flow—such as those output from an upstream diesel engine, either directly or as breakthrough from an upstream OCD; as well as those produced from soot particle burn-off during filter regeneration of the scDPF.

Preferably, the OC component is present in a loading of 0.01 to 10 g/cu ft; more preferably a loading of 0.5 to 5 g/cu ft; and more preferably yet a loading of 1-3 g/cu ft. Pd loadings may exceed these ranges if the material used is of relatively low activity and/or the application has relatively low normal operating or regeneration temperatures.

The OSC component included in the scDPF may be chosen from one or more of: basic compounds of alkali metals; alkaline earth metals; and REO materials. Preferred basic storage materials are compounds containing magnesium (Mg), barium (Ba), strontium (Sr), calcium (Ca), yttrium (Y), lanthanum (La), cerium (Ce), praseodymium (Pr), or neodymium (Nd). These compounds are also suitable for storing $NO_x$. For this reason, when basic storage materials containing an alkaline earth metal are mentioned in the context of the invention, they also include relevant carbonates and hydroxides.

Particular preference is given to cerium oxide and/or barium oxide in the OSC component. As a cerium-containing storage material, such as one selected from the group consisting of cerium oxide, a cerium-zirconium mixed oxide, a cerium oxide doped with rare earth and combinations thereof is preferable. Preferably the OSC includes cerium oxide ($CeO_2$), though the incorporation of other OSC materials may enhance the overall durability of the OSC component, as well as the overall function thereof. In particular, formulation of the OSC components in such a manner that they provide a strong active redox (e.g., oxidation-reduction) has been shown to particularly enhance the function of oxidation of soot at low temperatures when in contact with the material. Examples of this may be found in SAE 2010-01-0558 and U.S. Pre-Grant Publication 2005/0282698), the contents of each of which are incorporated herein in their entireties.

The OSC component serves as an oxygen storage/release material for storing excess oxygen during lean operation conditions and releasing stored oxygen during rich operation conditions to further promote the function of the OC component in oxidizing HC and CO constituents in the exhaust gas flow—such as those output from an upstream diesel engine, either directly or as breakthrough from an upstream OCD; as well as those produced from soot particle burn-off during filter regeneration of the scDPF.

The oxygen storage/release function of the OSC component may also be used, during rich/lean oscillations of the exhaust system, to promote soot particle burn-off during filter regeneration of the scDPF. While not being bound by theory, such a storage/release of oxygen in the scDPF is thought to promote better filter regeneration than a similar amount of time, temperature, energy expenditure in traditional hot, continuous lean filter regeneration.

In some examples, the OSC component may be selected to include a material having an $NO_x$ storage/release function, as at low operating temperatures (e.g., 125° C.-250° C.), in which instances the OSC component may also promote the function of the SCR catalyst in reducing $NO_x$ constituents which may improve performance of the scDPF during cold starts and early operation cycles. In addition, some of the OSC materials may also exhibit SCR functions of their own, for example an MOR-SCR, in which case there may be additional synergy.

Initially, it was expected that combining an SCR catalyst and an OC component (particularly a PGM material) into a single device would result in an efficiency loss of the SCR function for reducing $NO_x$ constituents. In particular, it is well known that PGM materials oxidize $NH_3$, and it was the conventional understanding that placement of a PGM component in close proximity to an SCR catalyst would present a risk that the PGM component would oxidize some fraction of the $NH_3$ supply, thereby lessening the quantity of $NH_3$ available to the SCR catalyst in the reduction of $NO_x$ constituents and, in some instances, producing secondary NO emissions. This concern is recognized, for example, in U.S. Pat. No. 7,767,176 B2, wherein there is provided a gap between an SCR catalyst and an $NH_3$ oxidation catalyst to avoid contamination of the two catalyst compositions, and any potential loss of catalytic activity caused by mixture of the two compositions.

Surprisingly, however, it was found that an scDPF according to the present invention may include both an SCR catalyst coating and an amount, in particular a smaller amount, of an OC component, such as a PGM material (preferably Pd), particularly when formulated with an OSC component, such as an REO material (preferably Ce), without significant impairment of the SCR function at temperatures up to and even exceeding 400° C. depending on loading and formulation. It is especially preferable that the scDPF be inclusive of: an SCR catalyst that includes a Cu-loaded CHA, LEV, AEI, AFI or SAPO-34; an OC component that includes Pd; and an OSC component that includes Ce (with or without one or more other OSC materials)—as such a combination is considered to provide the scDPF with better durability, $NO_x$ storage and direct contact soot oxidation in addition to the SCR function.

With such an arrangement, at normal SCR diesel operating temperatures (e.g., 150° C. to 450° C.), there will not be incurred a significant degree of $NH_3$ oxidation by the OC component as long as it is appropriately formulated, such that the SCR catalyst may make use of the $NH_3$ to reduce $NO_x$ constituents. On the other hand, at elevated temperatures, such as during active particle burn-off in filter regeneration (e.g., above 500° C.), the OC component will continue to oxidize HC and CO constituents in the exhaust gas. In this way, an scDPF according to the present invention is capable of providing the dual functions of reducing $NO_x$, via an SCR catalyst, and oxidizing HC and CO constituents, via an OC component, in a single exhaust device.

While not being bound by theory, it is expected that inclusion of the OSC and OC will allow a net benefit to an operating system whereby normal SCR function is substantially maintained under normal operating conditions, soot oxidation by oxygen is enhanced at temperatures below active regeneration temperatures, the threshold temperature for active soot oxidation is reduced, and CO and HC emissions characteristic of active soot filter oxidation are substantially mitigated. In particular, it has been shown that the combination of an OSC component and a PGM component can be particularly tuned such that the $NH_3$ lightoff of the PGM can be substantially delayed to higher temperatures.

Figure 12:
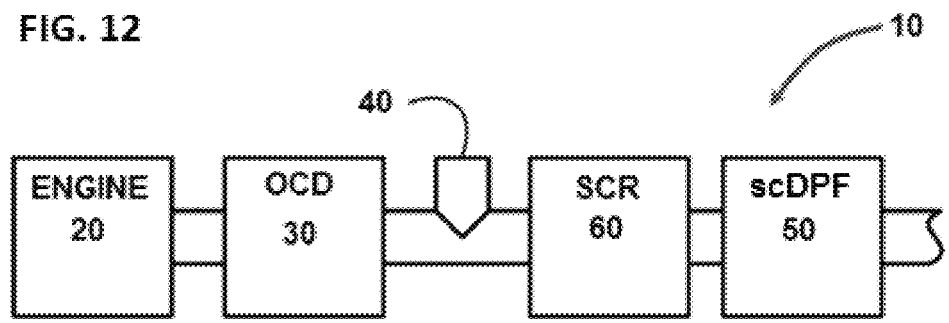
FIG. 12 illustrates an third example of an exhaust treatment system according to the present invention.
Figure 13:
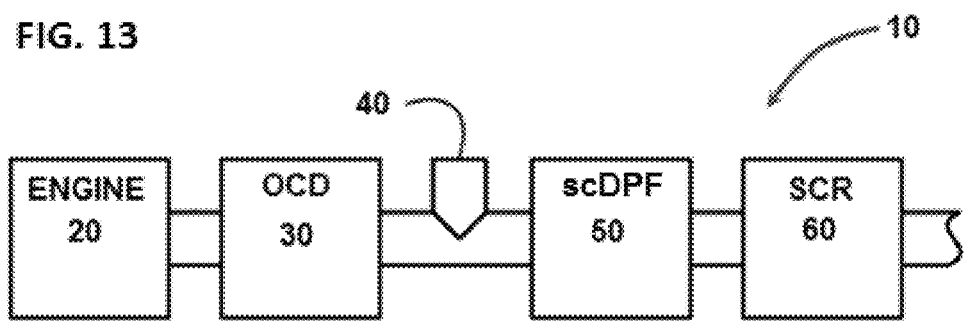
FIG. 13 illustrates an fourth example of an exhaust treatment system according to the present invention.
Figure 14:
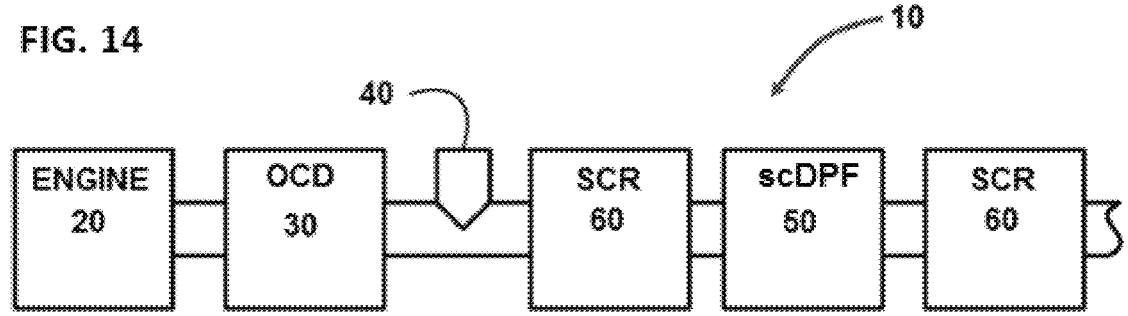
FIG. 14 illustrates an fifth example of an exhaust treatment system according to the present invention.
Figure 15:
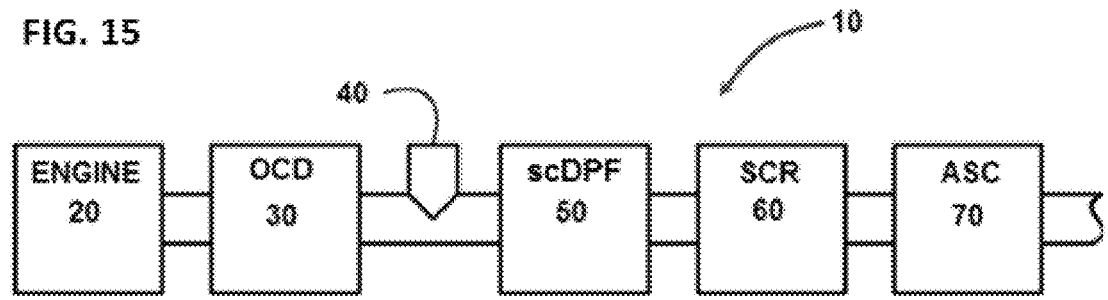
FIG. 15 illustrates an sixth example of an exhaust treatment system according to the present invention.
Figure 16:
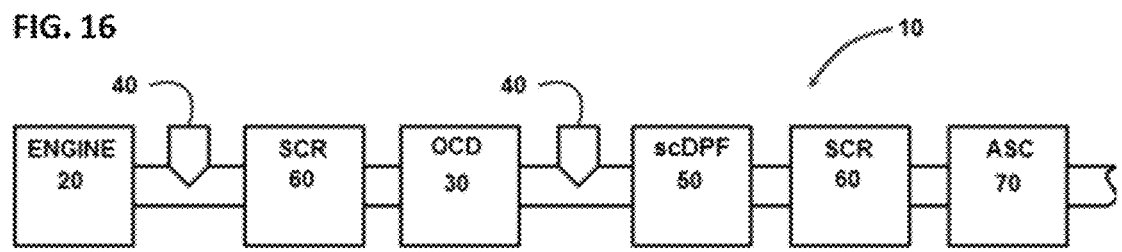
FIG. 16 illustrates a seventh example of an exhaust treatment system according to the present invention.
Figure 17:
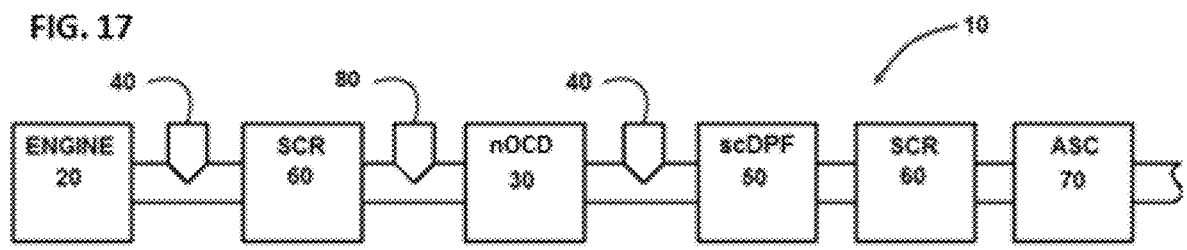
FIG. 17 illustrates an eighth example of an exhaust treatment system according to the present invention.

However, control of NOx during active regeneration can still be a significant issue when using the scDPF of the current invention within conventional exhaust treatment systems, under conventional control of $NH_3$ for NOx mitigation in the scDPF, as the ability to provide an SCR function by reduction of NOx by $NH_3$ at the high temperatures of filter regeneration may be hard to achieve, even with the lowering of the required temperature of soot oxidation by the presence of the OSC component and a smaller amount of an OC component. The balance of these competing $NH_3$ and CO/HC oxidation functions may more easily be met by providing alternate or supplemental provisions for NOx reduction during active filter regeneration, apart from the scDPF, such that $NH_3$ reduction of NOx in the scDPF is not required at the high temperatures of active regeneration. Such an alternate or supplemental provision for active regeneration may be obtained by providing an NOx reduction function via an SCR converter positioned upstream of the scDPF, either immediately upstream of the scDPF 50, as in FIGS. 12 and 14, or further upstream, as in ahead of the OCD 30, as in FIGS. 16 and 17, such that NOx reduction during filter regeneration can be primarily handled by the upstream device(s). An alternate or supplemental provision may also be provided by a second injection of urea or $NH_3$ behind the scDPF in the case where a further SCR catalyst is provided downstream of the scDPF 50, as in FIGS. 13-17 (it being noted that an additional injection nozzle 40 for introducing an SCR reducing agent may optionally be inserted between the scDPF 50 and the immediate downstream SCR converter 60 in each of these examples). Although FIGS. 16 and 17 depict both an SCR converter 60 and an ASC 70 positioned downstream of the scDPF 50, it is noted that further examples of the inventive system 10 may optionally omit those devices.

In arrangements in which an OCD with specific NOx storage function is upstream of the scDPF, or combinations of scDPF and SCR, and the NOx storing OCD is provided with appropriate high frequency fuel injection provisions, such that NOx can be substantially reduced in the NOx storing OCD during the active regeneration of the scDPF, additional synergies can be afforded. In such cases the oxygen storage "redox" function of the OSC component and the small amount of OC component in the scDPF provide a dual function of effective removal of HC and CO resulting from both the rich/lean oscillation through the NOx storing OCD, and secondary emissions produced within the scDPF from soot oxidation, as well as substantially improving/accelerating the active oxidation of soot during the regeneration.

Advantageously, the OSC component also provides a further benefit of counteracting the inverse tradeoff between the SCR reduction of $NO_x$ constituents and particle burn-off during filter regeneration. In particular, the OSC component promotes the oxidation of, and the release of chemical energy from, the soot accumulated in the filter (e.g., carbonaceous soot) at the OC component. This released energy, in turn, enhances particle oxidation, especially when the target filter regeneration temperature is low (e.g., approximately 450° C. to 550° C.), so as to improve soot burn-off, and filter regeneration completeness overall.

Thus, since, for example, modern heavy duty engines, in their normal duty cycles, and even at high loads, operate at temperatures near or below a range of about 350° C. to about 400° C., and since light duty vehicles, in their normal duty cycles, also primarily operate at temperatures below that range, the limited quantities of the OC and OSC components in the scDPF will not significantly limit performance of the SCR function. At the same time, the OC and OSC components will promote clean-up of HC and CO constituents, while also enhancing particle oxidation during a lean filter regeneration.

The SCR catalyst, OC component, and OSC component may be coated on the honeycomb body of the scDPF, via one or more layers, with a number of different arrangements and distributions. While not necessary, it is preferable that the SCR catalyst and the OC and OSC components be arranged on the honeycomb body in such a manner that $NO_x$ constituents and $NH_3$ quantities in an exhaust gas will be exposed to the SCR catalyst before reaching either the OSC component or the OC component, as this extends the operating temperature at which $NH_3$ oxidation starts to occur.

Figure 4A:
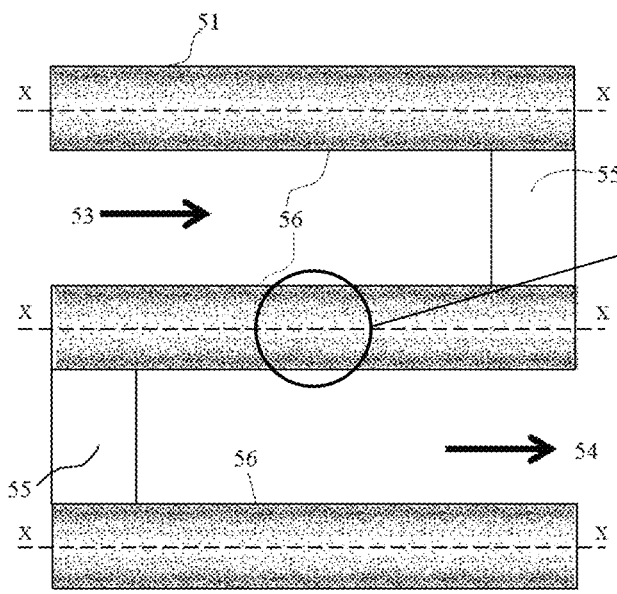
FIGS. 4A and 4B illustrate a first example of a coating arrangement of an scDPF according to the present invention.
Figure 4B:
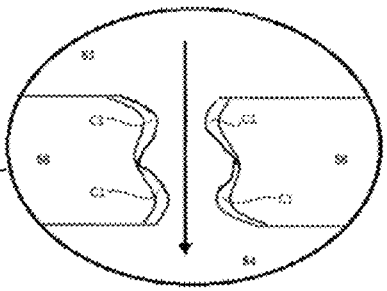

In one example, as shown in FIGS. 3 and 4A-4B, the OC and OSC components may be homogenously distributed in a common composition C1 with the SCR catalyst, with the single composition C1 extending along the entire length of the channels 53/54 of the honeycomb body 51. In the example illustrated in FIGS. 3 and 4A-4B, the single composition C1 of the coating 52 is applied in a two-step application process, wherein a first application of the composition C1 is introduced through either the inlet channels 53 or the outlet channels 54, and thereafter a second application of the composition C1 is introduced through the other of the outlet channels 54 and the inlet channels 53. As illustrated by the stippling in FIGS. 3 and 4A, and by the schematic in FIG. 4B, this two-step application process will result in the composition C1 being distributed within the pores of the porous walls 56, with a bias toward the surfaces of the walls 56 and a decreasing gradient toward the centers of the walls 56. Though the stippling effect is not repeated in the drawings of the further examples, it is noted that such distribution gradients will be present in coatings that are applied in two or more steps similar to those in this example.

In this first embodiment, because all three of the SCR catalyst and the OC and OSC components are mixed in a single composition C1, the coating process for the composition C1 may be performed in a single application step, wherein the composition C1 is introduced through only one end of the honeycomb body with sufficient pressure to fully coat the pores of the porous wall 56. In such an application process, the coating 52 of the composition C1 may yield a more uniform application of the composition C1 through the lengths of the pores in the porous walls 56 that lacks the gradient distribution as represented by the stippling effect in FIGS. 3 and 4A.

Figure 5A:
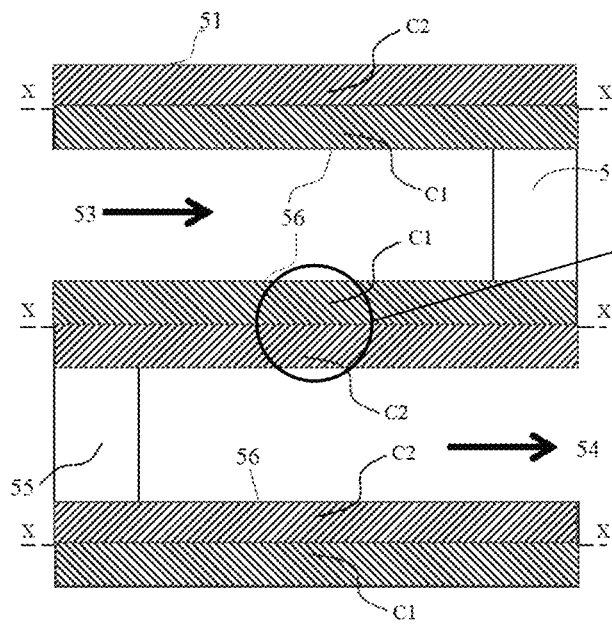
FIGS. 5A and 5B illustrate a second example of a coating arrangement of an scDPF according to the present invention.
Figure 5B:
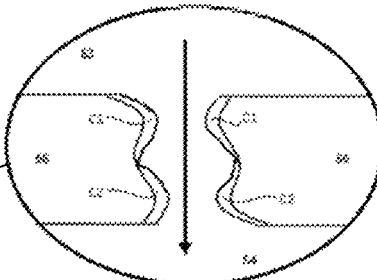

In another example of an scDPF according to the present invention, as shown in FIGS. 5A-5B, the SCR catalyst and the OC and OSC components may be applied to the honeycomb body 51 with a two-step coating arrangement. For example, a first coating of a composition C1 may be introduced through the inlet channels 53, and a second coating of a composition C2 may then be introduced through the outlet channels 54.

As illustrated by the schematic FIG. 5B, the first composition C1 will be biased toward surfaces of the porous walls 56 that are proximate the inlet channels 53 with a decreasing gradient toward the center of the porous walls 56; and the second composition C2 will be biased toward surfaces of the porous walls 56 that are proximate the outlet channels 54 with a decreasing gradient toward the center of the porous walls 56.

In an example such as that in FIGS. 5A-5B, the first composition C1 may comprise only the SCR component, or may comprise a combination of the SCR component and the OSC component; and the second composition C2 may comprise only the OC component, or may comprise a combination of the OC component and the OSC component. In some examples, the OSC component may be included in both the first and second compositions C1 and C2, with the same or different concentrations in the two compositions.

Figure 6A:
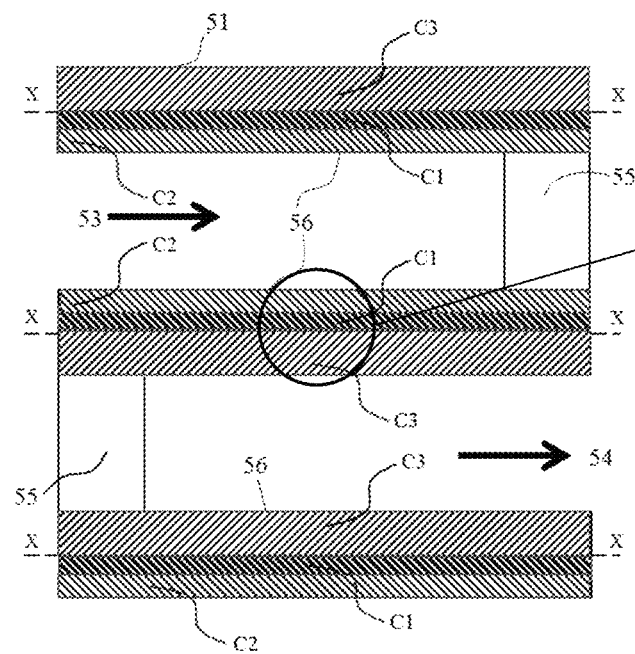
FIGS. 6A and 6B illustrate a third example of a coating arrangement of an scDPF according to the present invention.
Figure 6B:
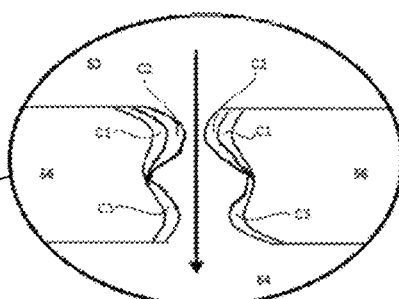

In another example of an scDPF according to the present invention, as shown in FIGS. 6A-6B, the SCR catalyst and the OC and OSC components may be applied to the honeycomb body 51 with a three-step coating arrangement. A first composition C1 may be introduced through the inlet channels 53, with a second composition C2 subsequently introduced through the inlet channels 53 over the first composition C1. A third composition C3 may be introduced through the outlet channels 54.

As illustrated by the schematic FIG. 6B, the first and second compositions C1 and C2 will be biased toward surfaces of the porous walls 56 that are proximate the inlet channels 53 with a decreasing gradient toward the center of the porous walls 56; and the third composition C3 will be biased toward surfaces of the porous walls 56 that are proximate the outlet channels 54 with a decreasing gradient toward the center of the porous walls 56.

In an example such as that in FIGS. 6A-6B, the first composition C1 may comprise only the OSC component, or may comprise a combination of the OSC component and the SCR component; the second composition C2 may comprise only the SCR component, or may comprise the SCR component and the OSC component; and the third composition C3 may comprise only the OC component, or may comprise a combination of the OC component and the OSC component. In some examples, the OSC component may be included in one, two or all three of the compositions C1-C3; and, when present in multiple compositions, may be present with the same or different concentrations among the separate compositions.

Figure 7A:
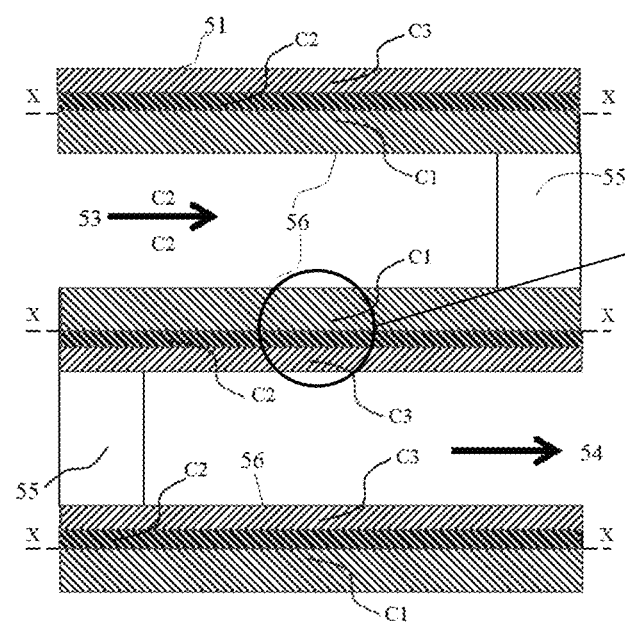
FIGS. 7A and 7B illustrate a fourth example of a coating arrangement of an scDPF according to the present invention.
Figure 7B:
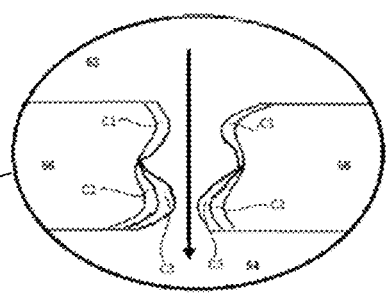

In another example of an scDPF according to the present invention, as shown in FIGS. 7A-7B, the SCR catalyst and the OC and OSC components may be applied to the honeycomb body 51 with a three-step coating arrangement. A first composition C1 may be introduced through the inlet channels 53, with a second composition C2 introduced through the outlet channels 54, and a third composition C3 subsequently introduced through the outlet channels 54 over the second composition C2.

As illustrated by the schematic FIG. 7B, the first composition C1 will be biased toward surfaces of the porous walls 56 that are proximate the inlet channels 53 with a decreasing gradient toward the center of the porous walls 56; and the second and third compositions C2 and C3 will be biased toward surfaces of the porous walls 56 that are proximate the outlet channels 54 with a decreasing gradient toward the center of the porous walls 56.

In an example such as that in FIGS. 7A-7B, the first composition C1 may comprise only the SCR component, or may comprise a combination of the SCR component and the OSC component; the second composition C2 may comprise only the OSC component, may comprise only the OC component, or may comprise a combination of the OSC component and the OC component; and the third composition C3 may comprise only the OC component, or may comprise a combination of the OC component and the OSC component. In some examples, the OSC component may be included in one, two or all three of the compositions C1-C3; and, when present in multiple compositions, may be present with the same or different concentrations among the separate compositions. In some examples, the OC component may be included one or both of the second and third compositions C2 and C3; and, when present in both compositions, may be present with the same or different concentrations among the separate compositions.

Figure 8A:
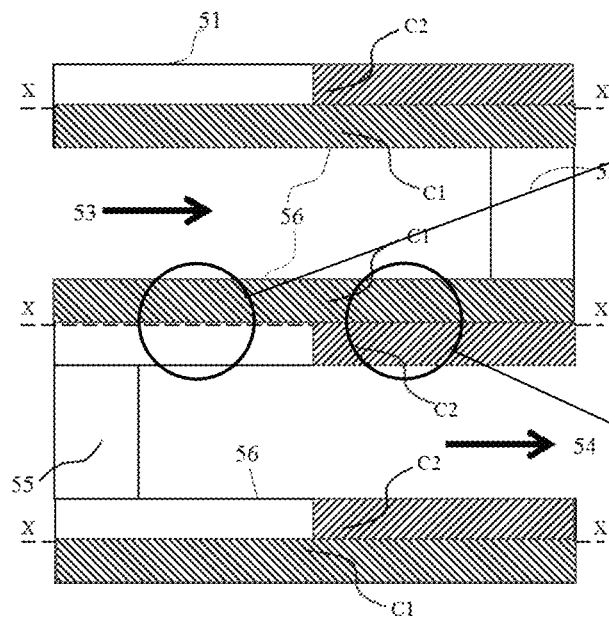
FIGS. 8A-8C illustrate a fifth example of a coating arrangement of an scDPF according to the present invention.
Figure 8B:
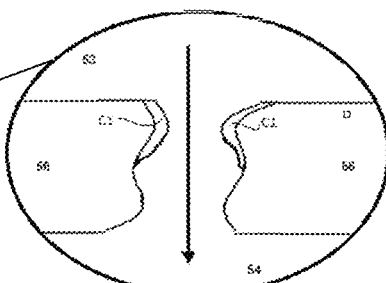
Figure 8C:
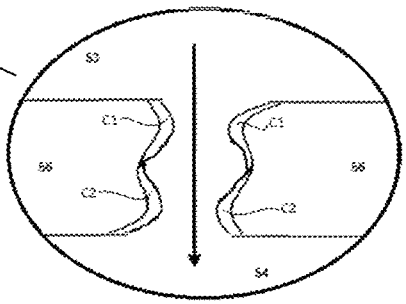

In another example of an scDPF according to the present invention, as shown in FIGS. 8A-8C, the SCR catalyst and the OC and OSC components may be applied to the honeycomb body 51 with a two-step coating arrangement, wherein one composition is applied over only a portion of the honeycomb body 51. A first composition C1 may be introduced through the inlet channels 53, with a second composition C2 introduced through the outlet channels 54. In this example, however, the first composition C1 is introduced over substantially the entire length of the inlet channels 53 of the honeycomb body 51, whereas the second composition C2 is applied over only a portion of the length of the outlet channels 54 of the honeycomb body 51.

As illustrated by the schematic FIGS. 8B-8C, the first composition C1 will be biased toward surfaces of the porous walls 56 that are proximate the inlet channels 53 with a decreasing gradient toward the center of the porous walls 56; and the second composition C2, in those axial zones where it is applied, will be biased toward surfaces of the porous walls 56 that are proximate the outlet channels 54 with a decreasing gradient toward the center of the porous walls 56.

In embodiments such as the example in FIGS. 8A-8C, the arrangement of the coating 52 may be understood as a dual-zoning arrangement, wherein the compositions C1 and C2 are radially-zoned relative to one another at the rear end of the honeycomb body 51 (as illustrated in FIG. 8C), and wherein application of the coating 52 as a whole is subject to an axial-zoning difference along the length of the honeycomb body 51 (as seen by the difference in coating applications observed upon comparing FIGS. 8B and 8C).

In an example such as that in FIGS. 8A-8C, the first composition C1 may comprise only the SCR component, or may comprise a combination of the SCR component and the OSC component; the second composition C2 may comprise only the OC component, or may comprise a combination of the OC component and the OSC component. In some examples, the OSC component may be included in one or both of the first and second compositions C1 and C2; and, when present in both compositions, may be present with the same or different concentrations among the separate compositions.

Figure 9A:
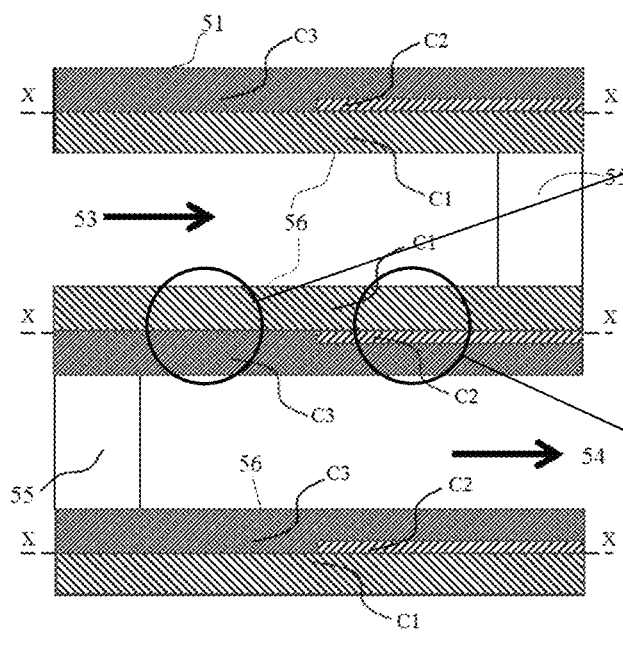
FIGS. 9A-9C illustrate a sixth example of a coating arrangement of an scDPF according to the present invention.
Figure 9B:
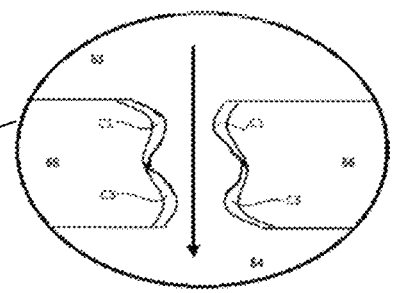
Figure 9C:
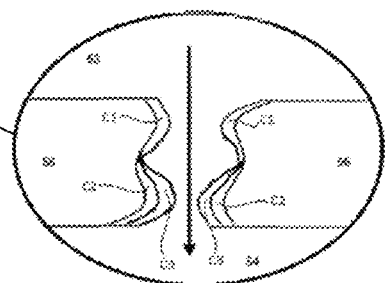

In another example of an scDPF according to the present invention, as shown in FIGS. 9A-9C, the SCR catalyst and the OC and OSC components may be applied to the honeycomb body 51 with a three-step coating arrangement.

A first composition C1 may be introduced through the inlet channels 53, with a second composition C2 introduced through the outlet channels 54, and a third composition C3 subsequently introduced through the outlet channels 54 over the second composition C2. In this example, however, the first composition C1 is introduced over substantially the entire length of the inlet channels 53 of the honeycomb body 51, whereas the second composition C2 is applied over only a portion of the length of the outlet channels 54 of the honeycomb body 51. The third composition C3 may be applied over substantially the entire length of the outlet channels 54 of the honeycomb body 51, or only over a portion thereof; though the third composition C3 is preferably applied over a length that is greater than the length over which the second composition C2 is applied.

As illustrated by the schematic FIGS. 9B-9C, the first composition C1 will be biased toward surfaces of the porous walls 56 that are proximate the inlet channels 53 with a decreasing gradient toward the center of the porous walls 56; and the second and third compositions C2 and C3, in those axial zones where they are respectively applied, will be biased toward surfaces of the porous walls 56 that are proximate the outlet channels 54 with a decreasing gradient toward the center of the porous walls 56.

In an example such as that in FIGS. 9A-9C, the first composition C1 may comprise only the SCR component, or may comprise a combination of the SCR component and the OSC component; the second composition C2 may comprise only the OSC component, may comprise only the OC component, or may comprise a combination of the OSC component and the OC component; and the third composition C3 may comprise only the OC component, or may comprise a combination of the OC component and the OSC component. In some examples, the OSC component may be included in one, two or all three of the compositions C1-C3; and, when present in multiple compositions, may be present with the same or different concentrations among the separate compositions. In some examples, the OC component may be included in one or both of the second and third compositions C2 and C3; and, when present in both compositions, may be present with the same or different concentrations among the separate compositions.

Figure 10A:
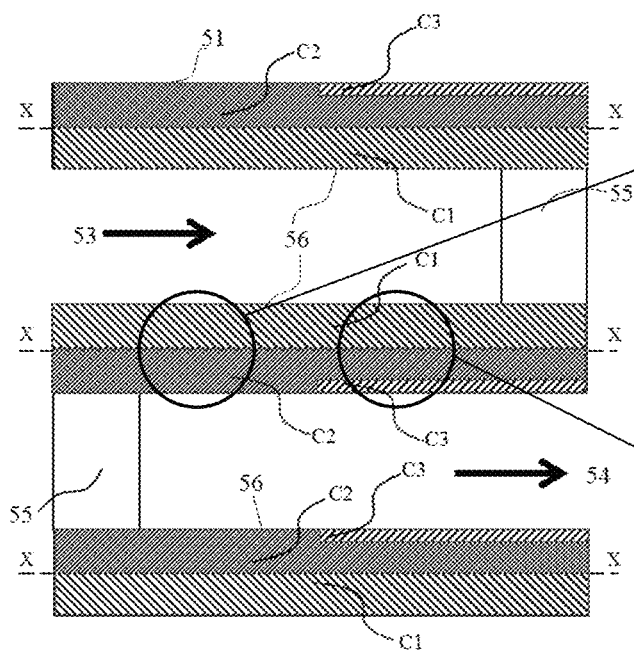
FIGS. 10A-10C illustrate a seventh example of a coating arrangement of an scDPF according to the present invention.
Figure 10B:
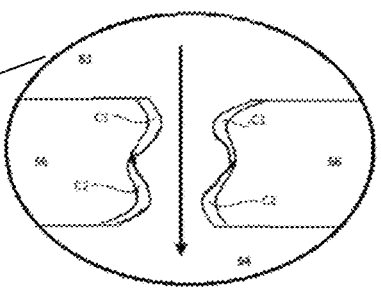
Figure 10C:
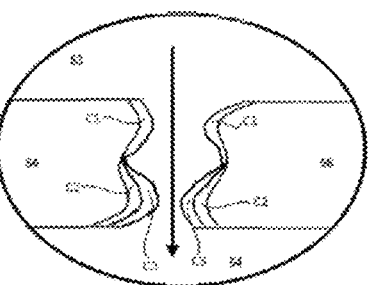

In another example of an scDPF according to the present invention, as shown in FIGS. 10A-10C, the SCR catalyst and the OC and OSC components may be applied to the honeycomb body 51 with a three-step coating arrangement.

A first composition C1 may be introduced through the inlet channels 53, with a second composition C2 introduced through the outlet channels 54, and a third composition C3 subsequently introduced through the outlet channels 54 over the second composition C2. In this example, however, the first composition C1 is introduced over substantially the entire length of the inlet channels 53 of the honeycomb body 51, and the second composition C2 is applied over substantially the entire length of the outlet channels 54 of the honeycomb body 51, or only over a portion thereof, whereas the third composition C3 is applied over only a portion of the length of the outlet channels 54 of the honeycomb body 51. The second composition C2, when applied over only a portion of the length of the outlet channels 54 of the honeycomb body 51, will preferably be applied over a length that is greater than the length over which the third composition C3 is applied.

As illustrated by the schematic FIGS. 10A-10C, the first composition C1 will be biased toward surfaces of the porous walls 56 that are proximate the inlet channels 53 with a decreasing gradient toward the center of the porous walls 56; and the second and third compositions C2 and C3, in those axial zones where they are respectively applied, will be biased toward surfaces of the porous walls 56 that are proximate the outlet channels 54 with a decreasing gradient toward the center of the porous walls 56.

In an example such as that in FIGS. 10A-10C, the first composition C1 may comprise only the SCR component, or may comprise a combination of the SCR component and the OSC component; the second composition C2 may comprise only the OSC component, may comprise only the OC component, or may comprise a combination of the OSC component and the OC component; and the third composition C3 may comprise only the OC component, or may comprise a combination of the OC component and the OSC component. In some examples, the OSC component may be included in one, two or all three of the compositions C1-C3; and, when present in multiple compositions, may be present with the same or different concentrations among the separate compositions. In some examples, the OC component may be included in one or both of the second and third compositions C2 and C3; and, when present in both compositions, may be present with the same or different concentrations among the separate compositions.

In nearly all of the foregoing examples, the SCR component is always present in the composition applied farthest upstream in the coating 52 arrangement, and the OC component is always positioned in a composition applied downstream of the composition containing the SCR component. In this way, $NO_x$ constituents and $NH_3$ quantities in an exhaust gas will be exposed to the SCR component before reaching the OC component, and there is therefore expected to be achieved an extension in the operating temperature at which $NH_3$ oxidation starts to occur. Exceptions to this separation of the SCR and OC components are inclusive of those in which all three components are mixed into a single composition, such as in the examples illustrated in FIGS. 3-4B.

Also in the foregoing examples, the potential for the OC component to lessen the function of the SCR catalyst in reducing NOx constituents may be further decreased if the catalytic compositions are applied in a manner such that the OSC component is dispersed over a greater portion of the scDPF than the OC component. In this way, the potential drawbacks of the OC component may be reduced by limiting the relative percentage of the OC component in the overall coating of the scDPF while maintaining the additional benefits of the OSC component over the entire filter.

Finally, while the examples illustrated in FIGS. 3-10C depict coatings 52 wherein the reactive materials are applied, primarily, only within the pores, it will be understood that one or more of the reactive materials may also be present in the form of a thin surface coating along the surfaces of the inlet channels 53 and/or the outlet channels 54 in addition to the coatings) within the pores. For example, in each of the foregoing examples, there may be formed a surface coating along the inlet channels 53 that comprises the SCR catalyst (with or without the OSC component mixed therein) and/or there may be formed a surface coating along the outlet channels 54 that comprises the OC component (with or without the OSC component mixed therein) in addition to those quantities of the reactive materials that are coated within the pores of the porous walls 56.

FIG. 2 illustrates one example of a diesel exhaust system 10 according to the present invention, which is inclusive of an scDPF 50 according to the present invention. In the exhaust system 10, diesel exhaust gases emitted from a diesel engine 20 are delivered first to an OCD 30 and, thereafter, to the scDPF 50. An injector 40 for injecting a quantity of reducing agent into the exhaust gas stream, is positioned upstream of the inlet to the scDPF 50. The injector 40 may be, for example, an air assisted type injector, a direct urea injector, or an $NH_3$ gas injector.

The OCD 30 may be either a diesel oxidation catalyst (DOC) 30A or an $NO_x$ storage converter (NSC) 30B. An upstream DOC 30A or NSC 30B can provide $NO_2$ to the downstream scDPF 50, with the $NO_2$ oxidizing soot particles at relatively low, or normal operating temperatures (e.g., 200-450° C.) to thereby provide a passive regeneration of the scDPF filter body 51. Such passive regeneration of the scDPF 50 will increase the time between active regeneration cycles thereof, thereby reducing thermal stress to the scDPF 50 and prolonging the useful life thereof.

In some examples, the diesel exhaust system 10 may include each of upstream DOC 30A, an intermediate NSC 30B, and a downstream scDPF 50.

In examples of the diesel exhaust system 10 where a DOC 30A is positioned upstream of the scDPF 50, the upstream DOC 30A is, preferably, a flow-through honeycomb body having a number of parallel elongated channels that extend along a length thereof, and which are open at both the inflow and outflow ends. The flow-through honeycomb body may be made of any suitable composition, including those contemplated for the honeycomb body of the scDPF. The DOC 30A is coated with an oxidation catalyst comprising an OC component, which may include any of those contemplated for the scDPF 50.

As the DOC 30A is often positioned closer to the engine, and thus subject to higher operating temperatures, it is preferable that the DOC 30A be formed of a composition having a suitable heat resistance. For example, the DOC 30A may comprise a washcoat primarily of alumina, with a PGM component dispersed throughout. Special care must be taken to design the DOC 30A for stability of the alumina, as well as the other components included therewith. The DOC 30A may further comprise zeolites for storing hydrocarbons for later oxidation, and may yet further comprise OSC materials and various levels of NOx storage components, which may be present in amounts up to and including such levels that the DOC 30A is effectively made into a fully functioning NSC.

The DOC 30A provides a first treatment to the exhaust gas, whereby HC constituents are oxidized to yield carbon dioxide ($CO_2$) and water ($H_2O$); and whereby CO constituents are also oxidized to yield $CO_2$. As a by-product, the DOC 30A will also oxidize NO to produce $NO_2$.

In examples of the diesel exhaust system 10 where an NSC 30B is positioned upstream of the scDPF 50, the upstream NSC 30B is, preferably, a flow-through honeycomb body having a number of parallel elongated channels that extend along a length thereof, and which are open at both the inflow and outflow ends. The flowthrough honeycomb body may be made of any suitable composition, including those contemplated for the honeycomb body of the scDPF 50. The NSC 30B is coated with an NOx adsorber catalyst (NAC) component or components (most NSCs use a combination of materials to store NOx over a wide temperature range), as well as many of the components to also provide the DOC function described above.

NSC's are sufficiently known to the person skilled in the art. Reference is made to the pertinent literature in relation to their design. See, for example, DE 102009039249 A, DE 102008048854 A, WO 13008342 A1, WO 12140784 A1, WO 2011023332 A, WO 2005092481 A, EP 1317953 A1, EP 1016448 B1, EP 1321186 B1, EP 1911506 A, and EP 1101528 A; the contents of each of which are incorporated herein in their entireties.

The NSC is designed to adsorb $NO_x$ from lean exhaust gas ($\lambda>1$), and to desorb the $NO_x$ when the oxygen concentration in the exhaust gas is substantially minimized and net rich ($\lambda<1$) conditions are achieved. Specifically, during lean operating conditions ($\lambda>1$), NO will be oxidized to $NO_2$; $NO_2$ will be oxidized to a nitrate; and the nitrate will be adsorbed on the surface of the NAC, or be allowed to exit the NSC to the downstream catalysts if the storage capacity of the NSC is substantially filled. Subsequently, during rich operating conditions ($\lambda<1$), the nitrate will be desorbed from the surface of the NAC and reduced to $NO_x$ (e.g., a mixture of NO and $NO_2$ constituents). If the nitrate is desorbed in the presence of a suitable reductant (e.g., HC and CO constituents), then the $NO_x$ may be further reduced to $N_2$ and $CO_2$. In some examples, a rich operating condition may be invoked via engine control and/or injection of a reductant supply into the exhaust gas stream to trigger a release of the $NO_x$.

The operating condition, and specifically, the air-fuel ratio ($\lambda$), can be adjusted as desired, based on a determination of the remaining $NO_x$ adsorption capacity of the NSC. Such a control may be achieved in a number of ways, including, for example: adjusting air-flow via throttling, intake and or exhaust valve manipulation, adjusting exhaust gas recirculation (EGR); injecting additional hydrocarbon fuel into the engine; and injecting additional hydrocarbon fuel directly into exhaust gas upstream of the NSC.

The NAC component may include basic compounds of alkali or alkaline earth metals which are deposited on suitable carrier materials. As the basic compounds for oxidizing $NO_x$ constituents to form nitrates for storage on the NSC, use may be made of alkali metals, alkaline earth metals, and rare earth metals, with particular preference given to compounds containing barium (Ba), magnesium (Mg), strontium (Sr), and calcium (Ca).

After passing the OCD 30 (e.g., a DOC 30A; an NSC 30B; or a combination thereof), the exhaust gas will proceed to the scDPF 50 where $NO_2$ output from the OCD 30 will oxidize carbonaceous soot trapped at the scDPF 50 at low or normal operating temperatures (e.g., 200 to 450° C.), in a passive regeneration of the scDPF 50. Such a passive regeneration of the scDPF increases the time between active regeneration cycles thereof. It is well known that active regeneration occurs at elevated operating temperatures (e.g., 450-650° C.), which contributes to thermal decay of the catalyst materials coated on and in the filter body. As such, use of passive regeneration via the $NO_x$ by-product from the upstream OCD 30 will prolong the life of the scDPF 50, and the exhaust system 10 as a whole, by decreasing the frequency at which the scDPF 50 is exposed to such elevated temperatures.

The SCR catalyst of the scDPF 50, with the presence $NH_3$, will reduce $NO_x$ to yield $N_2$ and $H_2O$. $NO_2$ enhances reaction of NOx to $N_2$ with $NH_3$ up until the point where its concentration reaches 50%. However, $NO_2$ also oxidizes soot and is reduced to NO in the process, so there is a competition between the $NO_2$ reaction to oxidize soot and the $NO_2$ reaction with NO and $NH_3$ for NOx reduction.

The OC component will oxidize HC and/or CO constituents that breakthrough the OCD 30, as well as CO produced from the oxidation of soot at the scDPF 50, to yield $CO_2$ and $H_2O$. In some examples, the OC component, when carefully selected and modified, can be incorporated into a common composition with the SCR catalyst. Preferably, however, the OC component is located downstream of the SCR catalyst (e.g., as a different zone or layer) so as to lessen the potential that the OC component will oxidize $NH_3$ quantities that are instead needed for the SCR function, and to lessen the potential that any OC component migrates to the SCR catalyst. The OSC component may be incorporated into a common composition with the SCR catalyst, where it can provide a function of enhancing soot oxidation with oxygen, when soot is in direct contact with the OSC component, but the OSC component can also serve to moderate the activity of the OC component when it is appropriately associated therewith. Regardless of where the OSC component is located, it will act to provide oxygen during the rich periods for NSC High Frequency fuel injection control during active regenerations and during NSC desulfations, and can further provide a low temperature NOx storage function. It is further preferable that the OSC component have a higher concentration proximate to the SCR catalyst, as compared to the concentration of the OC component present proximate to the SCR catalyst (if any).

The OSC component serves as an oxygen storage/release component for further promoting the oxidation of HC and CO constituents by the OC component, as well further promoting the oxidation of soot during filter regeneration. While not being bound by theory, the storage and release of oxygen in the scDPF 50 during rich/lean oscillations is thought to promote better soot regeneration than a similar amount of time, temperature, energy expenditure in traditional hot, continuous lean filter regeneration.

The OSC component may also be made to further promote the reduction of $NO_x$ by the SCR catalyst. In particular, the NOx storage potential of the OSC component may be expected to store NOx at low temperatures, temperatures at which the scDPF 50 is too cold to effectively reduce NOx (e.g., 125-200° C.). At temperatures at which the scDPF 50 would be expected to be able reduce NOx the OSC component can release the NOx allowing it to be reduced. This function can be intentionally tailored and is a primary function within a class of NOx storing oxidation catalysts commonly called Passive NOx Adsorbers (PNA). This storage function may be used to benefit the overall low temperature NOx performance of the system. It is noted that cerium-oxide may, in some instances, serve as an SCR material itself with the OSC component acting as a supplemental SCR catalyst.

As discussed above, in examples including an NSC 30B as the upstream OCD 30, the NSC 30B will include an NAC component having an $NO_x$ storage/release function. In addition, in examples including a DOC 30A, the DOC 30 may likewise include an NAC component having an $NO_x$ storage/release function (i.e., a DOAC 30A). An OCD having an NAC component (e.g., an NSC or a DOAC) may be referred to, generically, as an nDOC. The NAC component of the DOAC 30A may include the same materials as those discussed above relative to the NAC component of the NSC 30B, but in particular Ceria and related materials may be used.

The NAC component of an nDOC may include materials that store $NO_x$ below about 200° C., and which release stored $NO_x$ at about 250-300° C. by only thermal means without rich ($\lambda<1$) conditions, depending on formulation and application requirements. In some examples, the NAC component may be a passive NOx absorber (PNA), that stores NOx at low temperatures that are below that which an SCR catalyst can effectively reduce the NOx, and which passively releases the NOx at elevated temperatures at which in can effectively be reduced by a downstream SCR catalyst (of either an scDPF or an SCR converter). In examples where the SCR catalyst is directly downstream of the PNA, it is preferable the passive release temperature be not greater than approximately 200° C. so as to promote the release of stored NOx when the system is fully warmed, thereby reducing the potential for the PNA to be at full NOx storage capacity when the vehicle is shut down, as a full storage capacity of the PNA would prevent the storage of NOx during a subsequent cold start of the vehicle. As a further measure for avoiding shut-down of the vehicle while the NAC component is at full capacity, the system may be configured, via an ECU, when it is determined that the NAC component is at full capacity during a time when the downstream SCR catalyst(s) (e.g., the scDPF and any SCR converter(s)) are not at sufficiently high temperatures to effectively reduce the NOx, to operate the engine under rich conditions ($\lambda<1$) to regenerate the NAC component.

Figure 11:
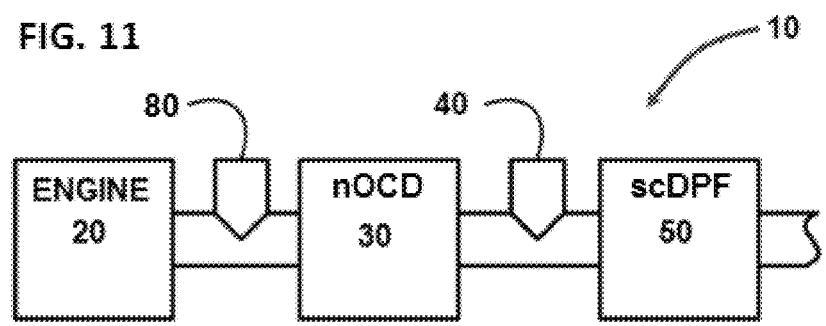
FIG. 11 illustrates a second example of an exhaust treatment system according to the present invention.

The function of the NAC component, in further promoting soot oxidation by high temperature oxidation and/or $NO_x$ reduction, may be finely controlled through the use of a high frequency injection (HFI) fuel control. That is, in embodiments of the exhaust system 10 such as those shown in FIGS. 11 and 17, the system 10 may be operated under high frequency series of lean/rich oscillations whereby fuel is injected into the exhaust gas stream in short, high frequency pulses via an HFI injector 80 positioned, for example, at a location immediately upstream of an nOCD 30, preferably in the form of an NSC 30B. An example of HFI fuel control is provided in SAE2011-01-2089, the contents of each of which are incorporated herein in their entirety.

An HFI fuel control may be used to substantially remove the $NO_x$ constituents during a filter regeneration cycle, preferably with the regeneration cycle carried out quickly and effectively at temperatures at which the SCR catalyst of the scDPF 50 would not have a sufficiently high $NO_x$ conversion (e.g., greater than 500° C.). Preferably, HFI fuel control ensures that substantial and sufficient NOx conversion is provided by the nOCD 30 so that none is required by the scDPF 50 or any downstream and SCR converter(s). In this way, the HFI fuel control is considered to lessen, or even remove, the inverse tradeoff between $NO_x$ reduction and filter regeneration—which, in turn, enables the scDPF 50 to more fully address the clean-up of rich breakthrough products (e.g., HC and CO constituents), as well as the clean-up of products from the combustion of soot particles (e.g., CO from carbon combustion).

In conventional systems, however, it has been found that HFI fuel control of an nOCD 30 presents a drawback in that, due to a temporary oxygen deficiency during rich pulses, there may occur a significant breakthrough of HC constituents (HC slip), with the further potential of excessive emission of HC constituents even when there is provided with an OC-based oxidation function at a downstream location. The HC slip at the nOCD 30 may also cause a downstream production of CO constituents, upon the oxygen reacting at the high filter regeneration temperatures with carbonaceous soot particles trapped at the scDPF 50. As such, the use of HFI fuel control of an nOCD 30 in a conventional exhaust system, in an attempt to address the inverse tradeoff between $NO_x$ reduction and filter regeneration, would be expected to present a further tradeoff relative to the emissions levels of HC and CO constituents.

An scDPF 50 according to the present invention, however, has been found to significantly lessen and possibly eliminate the further tradeoff between: addressing the inverse tradeoff between $NO_x$ reduction and filter regeneration; and controlling the emissions of HC and CO constituents. Particularly, forming the OSC component of the scDPF 50 with a material having an oxygen storage/release function that will release oxygen during rich conditions (coinciding with a rich pulse of the HFI fuel control), the OSC component may provide elevated oxygen levels for further promoting the oxidation of HC and CO constituents at the OC component of the scDPF 50. In this way, the OC and OSC components of an scDPF 50 according to the present invention cooperate to provide an enhanced cleanup function that can address elevated levels of HC and CO constituents, such as those that might occur as a result of HFI fuel control of the nOCD 30.

Embodiments of the invention are inclusive of exhaust systems wherein no further SCR component is provide upstream and/or downstream of the scDPF; and embodiments wherein the SCR catalyst of the scDPF 50 represents the sole SCR component in the entire exhaust system. However, in some examples, such as those shown in FIGS. 12-17, the exhaust system 10 may include one or more SCR converters 60 positioned upstream of the scDPF 50, and/or one or more SCR converters 60 positioned downstream of the scDPF 50, or even one or more SCR converters positioned upstream of the OCD 30. The inclusion of the SCR component, whether on SCR converter(s) 60 or on an scDPF 50, is primarily for reducing NOx when an nOCD 30 is not being used for NOx reduction. However, when an nOCD 30 is positioned upstream of an SCR component, the nOCD 30 may be used either for temporary low temperature storage, low temperature ongoing NOx storage reduction with rich regeneration, or in a preferred arrangement also for NOx reduction under HFI control ahead of the scDPF 50, thereby enabling regeneration of the scDPF 50 at temperatures that would otherwise be too high for good effective NOx conversion by the SCR component.

Any SCR converter(s) 60 included in the exhaust system 10 may be provided as either a wall-flow honeycomb body or a flow-through honeycomb body. In order to avoid increased backpressures, however, it is preferable that any SCR converter 60 added to the exhaust system 10 be provided as a flow-through honeycomb body. The honeycomb body of the SCR converter 60 may be formed from materials including those discussed above relative to the honeycomb body of scDPF 50; and the SCR catalyst of the SCR converter 60 may include those same materials discussed above relative to the SCR catalyst of the scDPF 50. In specific examples, the SCR converter 60 may include a honeycomb body composed of the same or different materials as the honeycomb body of the scDPF 50; and may likewise include an SCR catalyst composed of the same or different materials as the SCR catalyst of the scDPF 50.

For example, the scDPF 50 may include a cordierite wall-flow honeycomb body coated with a copper loaded SAPO or CHA SCR catalyst, whereas an upstream and/or downstream SCR converter 60 may include a cordierite or metallic flow-through honeycomb body coated with an iron and/or copper loaded zeolite or similar SCR catalyst.

When one or more an SCR converters 60 are positioned upstream of the scDPF 50, an upstream SCR converter 60 will provide an initial $NO_x$ reduction function, and an injection nozzle 40 for introducing an SCR reducing agent (e.g., $NH_3$, urea, etc.) will be positioned upstream of the inlet to the SCR converter 60. In such examples, the SCR catalyst of the downstream scDPF 50 will provide a secondary $NO_x$ reduction function with any excess quantities of $NH_3$ that breakthrough the upstream SCR converter 60. When one or more SCR converters are positioned upstream of the scDPF 50 and/or the OCD 30, there also is an opportunity for the upstream SCR converter(s) 60 to provide an NOx reduction function during active regeneration. In such examples, the provision of Ce for reducing the oxidation temperature of soot that contacts the scDPF 50, and the presence of the OC component for burning incoming HC and CO from fuel burned in the upstream OCD 30 and CO resulting from soot oxidation, will increase the internal temperature of the scDPF 50. By virtue of reducing the incoming temperature in this way, for good soot oxidation by the OSC and OC components in the scDPF 50, any upstream SCR converter(s) 60 will be at a better temperature for NOx reduction, preferably at about 500° C. or less than would be the case for a conventional system in which a conventional sDPF would be used and which conventional system would require higher temperatures for effective soot oxidation (e.g., typically at about 550° C. or higher). In the case where an SCR catalyst is positioned upstream of the OCD 30, that SCR catalyst may be operated at a substantially lower temperature if temperature control for regeneration of the scDPF 50 is provided, primarily, by oxidation of fuel in the OCD 30. In systems where there is provided an SCR component upstream of the scDPF 50, that SCR component may also be used in cooperation with an NSC that reduces NOx constituents under HFI fuel control during filter regeneration, with the additional SCR component lessening the burden placed on the HFI fuel controlled NSC.

Alternatively, when one or more SCR converters 60 are positioned downstream of the scDPF 50, the scDPF 50 will serve as the initial device for reduction of $NO_x$ constituents, with the injection nozzle 40 for introducing an SCR reducing agent positioned ahead of the inlet to the scDPF 50. In such examples, the downstream SCR converter(s) 60 will serve as secondary devices for the reduction of $NO_x$ constituents.

The system 10 may further include an ammonia slip catalyst (ASC) 70 at the outlet end for converting quantities of $NH_3$ that breakthrough the upstream devices. In some examples, such as those shown in FIGS. 15-17, an ASC coating may be applied alone to a separate support body at the end of the exhaust system 10. Though not illustrated, in examples that include one or more SCR converters 60 downstream of the scDPF 50, an ASC coating may be provide at the outlet end of the honeycomb body of the final SCR converter 60. The ASC coating may include materials selected from a range of SCR functional materials and PGM material choices, particularly Pt.

Though not shown, in yet further examples where the scDPF 50 is the final device in the exhaust system 10, the scDPF 50 itself may serve an ASC function; and the coatings applied to the scDPF 50 may be arranged to enhance the ASC function at the outflow end of the scDPF 50. For example, a separate ASC coating may be applied to a downstream end of the body of the scDPF 50. In some examples, an ASC function may be provided as an extension of the coating of the scDPF 50 by, for example, applying the OC component with a loading that is higher at the downstream end of the body of the scDPF 50, either by zoning or by formation of a gradient in the coating containing the OC component. If forming the ASC coating with a Pt component, it is preferable that $NH_3$ be prevented from reaching the Pt component before first passing through an SCR catalyst, that $NH_3$ be oxidized to NOx, and that $NH_3$ also pass through a further SCR catalyst before exiting the body of the scDPF 50. In one example of an ASC coating comprising a Pt component, the Pt component may be deposited under a clear overcoat layer of an SCR catalyst.

An exhaust system according to the present invention may be made to include any combination of the foregoing devices, based on the needs of the particular vehicle in which the exhaust system is to be installed.

In one example, for a heavy duty vehicle, where passive soot regeneration is highly desirable and achievable, the system may include the scDPF 50 with limited quantities of OC component (principally palladium, Pd), and the OSC component (principally cerium oxide, CeO) placed downstream of an nOCD (e.g., a DOAC or an NSC). The NAC component of the nOCD will be formulated to perform well for $NO_x$ control under high temperature HFI fuel control conditions, and to make $NO_2$ by oxidation of NO under normal operating conditions and temperatures, even when completely filled with $NO_x$. Preferably, the NAC component should also include materials that store NO below about 200° C. and release $NO_x$ at about 300° C. to enhance cold start $NO_x$ emissions without requiring rich purges for low temperature $NO_x$ reduction. Optionally, an SCR converter 60 may be placed downstream of the scDPF 50, and an ASC may be included therebehind (either as an end portion of the SCR converter 60, or as a separate downstream ASC 70 device). In such an example, cleanup of HC and CO constituents during the HFI fuel controlled filter regeneration would still be primarily accomplished by the OC and OSC components of the scDPF 50, though the ASC may provide additional cleanup function.

In another example, for a light duty vehicle, the system may have the same set-up as in the heavy duty vehicle example above, though since cold start emissions are a more significant part of the light duty emissions cycle, and because light duty diesels operating at high loads (e.g., during towing, high altitude, etc.) may run too hot, it may be preferable to place an SCR converter 60 upstream of the scDPF 50, rather than downstream thereof. As the upstream SCR converter 60 will lack any OC and OSC components, any HC constituents that breakthrough from the nOCD 30 during filter regeneration will pass through the SCR converter 60 and reach the scDPF 50. In this way, high temperature NO reduction will occur primarily at the upstream SCR converter 60, without compromise, as the majority of NH$_3$ is consumed by SCR reaction or oxidized at the upstream SCR converter 60. The scDPF 50 may be positioned as the last device in the system 10, then an ASC coating may be located at the outflow end thereof, or the OC component may be located so as to lessen any interference with the NO$_x$ reduction by the SCR catalyst coated thereon. In this case the passive soot regeneration function provided by the NO$_2$ output from the nOCD 30 would be substantially reduced, but may be a reasonable compromise for light duty temperatures and duty cycles. Note that in this configuration the special function of the OSC and OC in the scDPF 50 allowing a lower required inlet temperature for effective active regeneration of the soot enables better SCR performance of the SCR ahead without the need for HFI fuel control through an nOCD as the primary NOx reduction function during active regeneration.

What is claimed is:

1. A particle filter comprising:
   a selective catalytic reduction (SCR) catalyst that, when in the presence of a reducing agent, promotes selective catalytic reduction of nitrogen oxides;
   an oxidation catalyst (OC) component that promotes oxidation of hydrocarbons and carbon monoxide; and
   an oxygen storage catalyst (OSC) component that alternates between adsorbing and storing oxygen and desorbing and releasing oxygen when exposed to oscillating rich and lean exhaust conditions, the OSC component comprising a material that lowers the oxidation temperature for soot that comes in contact with said material, wherein
   the SCR catalyst, the OC component, and the OSC component are each present in a coating provided on the particle filter in an arrangement, with the amount of the OC component and the OSC component being smaller than the amount of the SCR catalyst, with the OC component being present in a loading of 0.01 to 10 g/cu ft, whereby, upon delivering an exhaust gas stream comprising nitrogen oxides (NO$_x$) and ammonia (NH$_3$) into an inlet end of the particle filter, there is promoted an initial contact of the NO$_x$ and the NH$_3$ with the SCR catalyst prior to an initial contact of the NO$_x$ and the NH$_3$ with the OC component and the OSC component.

2. The particle filter of claim 1, wherein
   the SCR catalyst comprises at least one material selected from: MOR; USY; ZSM-5; ZSM-20; beta-zeolite; CHA; LEV; FER; SAPO; ALPO; vanadium; vanadium oxide; titanium oxide; tungsten oxide; molybdenum oxide; cerium oxide; zirconium oxide; niobium oxide; iron; iron oxide; manganese oxide; copper; molybdenum; tungsten; and mixtures thereof.

3. The particle filter of claim 1, wherein
   the SCR catalyst comprises copper, the copper being loaded on a zeolite or zeotype structure.

4. The particle filter of claim 3, wherein the zeolite or zeotype structure is chabazite or levyne.

5. The particle filter of claim 3, wherein the zeolite or zeotype structure is SAPO.

6. The particle filter of claim 1, wherein
   the OC component comprises at least one material selected from: platinum; palladium; rhodium; iridium; silver; gold; copper; iron; and combinations thereof.

7. The particle filter of claim 1, wherein
   the OSC component comprises at least one material selected from: basic compounds of alkali metals; alkaline earth metals; magnesium; barium; strontium; calcium; cerium; and combinations thereof.

8. The particle filter of claim 1, wherein
   the OC component comprises palladium, and the OSC component comprises cerium.

9. The particle filter of claim 1, wherein
   the coating is applied over the entire length of the particle filter.

10. The particle filter of claim 1, wherein
    the arrangement of the coating is one selected from: a zoning arrangement; a layering arrangement; a permeation arrangement; and combinations thereof.

11. The particle filter of claim 10, wherein
    the arrangement of the coating comprises a zoning arrangement with the SCR catalyst is present over the entire length of the particle filter, and both the OC component and the OSC component positioned in one or more zones toward an outlet end of the particle filter.

12. The particle filter of claim 10, wherein
    the arrangement of the coating comprises a layering arrangement with both the OC component and the OSC component positioned in one or more layers, and the SCR catalyst positioned in a layer applied over the one or more layers comprising the OC component and the OSC component.

13. An exhaust system comprising the particle filter of claim 1, wherein
    an oxidation catalytic device (OCD) is positioned upstream of the particle filter.

14. The exhaust system of claim 13, wherein
    one or more selective catalytic reduction (SCR) converters are positioned upstream and/or downstream of the particle filter.

15. The exhaust system of claim 14, wherein
    the one or more of the SCR converters comprise a copper loaded chabazite structure.

16. The exhaust system of claim 14, wherein
    the one or more of the SCR converters comprise a copper loaded SAPO structure.

17. The exhaust system of claim 14, wherein
    the particle filter comprises a chabazite or SAPO structure, and
    the one or more SCR converters comprise a chabazite and/or SAPO structure.

18. The exhaust system of claim 13, further comprising: an ammonia slip catalyst (ASC) component.

19. The exhaust system of claim 13, wherein
    the exhaust system is a diesel exhaust system.

20. The particle filter of claim 1, wherein
    the particle filter is a diesel particle filter.

21. The particle filter of claim 1, wherein
    the particle filter comprises a support body in the form of a wall-flow honeycomb filter, and the coating is provided on the support body.

22. The particle filter of claim 21, wherein
    the support body is formed from one or more materials selected from: cordierite, cordierite-alumina, silicon nitride, mullite, zircon mullite, spodumene, alumina-silica magnesia, zircon silicate, sillimanite, a magnesium silicate, zircon, petalite, alpha-alumina, an aluminosilicate, silicon carbide (SiC), aluminum titanate, and high temperature steel alloys.

23. The particle filter of claim 1, wherein
    the particle filter comprises a support body in a form selected from: a wall-flow honeycomb body, one or more corrugated sheets, a mass of fibers, a mass of open-cell foam, and a volume of porous particle bodies.

24. The particle filter of claim 1, wherein
the OC component includes one or more platinum group metals (PGMs) selected from: platinum, palladium, rhodium, ruthenium, osmium, and iridium.

25. The particle filter of claim 1, wherein
the OSC component comprises at least one material selected from: basic compounds of alkali metals; alkaline earth metals; and rare earth oxide metals.

26. The particle filter of claim 1, wherein
the OSC component comprises one or more compounds containing one or more materials selected from: magnesium, barium, strontium, calcium, yttrium, lanthanum, cerium, praseodymium, and neodymium.

27. The particle filter of claim 1, wherein
the SCR catalyst, the OC component, and the OSC component are coated on the particle filter in such an arrangement that nitrogen oxide ($NO_x$) constituents and ammonia ($NH_3$) quantities in an exhaust gas that passes through the particle filter will be exposed to the SCR catalyst before being exposed to the OSC component and before being exposed to the OC component.

28. A particle filter comprising
a selective catalytic reduction (SCR) catalyst that, when in the presence of a reducing agent, promotes selective catalytic reduction of nitrogen oxides;
an oxidation catalyst (OC) component that promotes oxidation of hydrocarbons and carbon monoxide; and
an oxygen storage catalyst (OSC) component that alternates between adsorbing and storing oxygen and desorbing and releasing oxygen when exposed to oscillating rich and lean exhaust conditions, the OSC component comprising a material that lowers the oxidation temperature for soot that comes in contact with said material, wherein
the SCR catalyst, the OC component, and the OSC component are each present in a coating provided on the particle filter in an arrangement whereby, upon delivering an exhaust gas stream comprising nitrogen oxides ($NO_x$) and ammonia ($NH_3$) into an inlet end of the particle filter, there is promoted an initial contact of the $NO_x$ and the $NH_3$ with the SCR catalyst prior to an initial contact of the $NO_x$ and the $NH_3$ with the OC component and the OSC component, and
the arrangement of the coating is one whereby a portion of the filter body that is occupied by the OSC component is greater than a portion of the filter body that is occupied by the OC component, while some amount of the SCR catalyst is present over substantially the entire length of the particle filter.

29. The particle filter of claim 28, wherein
the arrangement of the coating is one whereby the OSC component and the SCR catalyst are present over substantially the entire length of the particle filter, and the OC component is present only in a region toward an outlet end of the particle filter.

* * * * *